(12) United States Patent
Doughty et al.

(10) Patent No.: US 8,082,575 B2
(45) Date of Patent: *Dec. 20, 2011

(54) SYSTEM, METHOD AND APPARATUS FOR ENABLING TRANSACTIONS USING A USER ENABLED PROGRAMMABLE MAGNETIC STRIPE

(75) Inventors: Ralph O. Doughty, Colleyville, TX (US); Patrick R. Antaki, Plano, TX (US); Kenneth P. Weiss, Newton, MA (US)

(73) Assignee: Rampart-ID Systems, Inc., Richardson, TX (US)

( * ) Notice: Subject to any disclaimer, the term of this patent is extended or adjusted under 35 U.S.C. 154(b) by 310 days.

This patent is subject to a terminal disclaimer.

(21) Appl. No.: 11/359,015

(22) Filed: Feb. 21, 2006

(65) Prior Publication Data

US 2006/0161789 A1    Jul. 20, 2006

Related U.S. Application Data

(63) Continuation-in-part of application No. 10/680,050, filed on Oct. 7, 2003, which is a continuation-in-part of application No. 10/400,306, filed on Mar. 27, 2003, now Pat. No. 7,337,326.

(60) Provisional application No. 60/368,363, filed on Mar. 28, 2002.

(51) Int. Cl.
*G06F 7/04* (2006.01)
(52) U.S. Cl. ............... 726/2; 713/186; 726/20
(58) Field of Classification Search ............ None
See application file for complete search history.

(56) References Cited

U.S. PATENT DOCUMENTS

| 4,405,829 | A |   | 9/1983 | Rivest et al. |
| 4,582,985 | A | * | 4/1986 | Lofberg ............... 235/380 |
| 4,609,777 | A |   | 9/1986 | Cargile |
| 4,614,861 | A |   | 9/1986 | Pavlov et al. |

(Continued)

FOREIGN PATENT DOCUMENTS

EP    1 094 682    10/1999

(Continued)

OTHER PUBLICATIONS

Leydier (USPN 2003/0046554) in view of Pfaffenberg (Webster's New World Dictionary of Computer Terms, 7th edition, ISBN: 0-02-862884-5, 1999, p. 137).*

(Continued)

*Primary Examiner* — Peter Poltorak
(74) *Attorney, Agent, or Firm* — Daniel J. Chalker; Chalker Flores, LLP

(57) ABSTRACT

The present invention provides a system, method and apparatus that includes a user device having a magnetic field generator disposed within a substrate that is normally inactive, an initiator mounted on the substrate, a memory disposed within the substrate and a processor disposed within the substrate that is communicably coupled to the magnetic field generator, the initiator and the memory. The processor is operable to process information received from the initiator, generate a time varying code in response to the received information and activate the magnetic field generator. A power source is also disposed within the substrate. The magnetic field generator can create a spatial magnetic signal using a magnetic stripe and one or more induction coils, or create a time-varying magnetic signal for emulating data obtained from swiping a traditional magnetic stripe card through a magnetic card reader.

39 Claims, 20 Drawing Sheets

U.S. PATENT DOCUMENTS

| | | | |
|---|---|---|---|
| 4,701,601 A | 10/1987 | Francini et al. | |
| 4,720,860 A | 1/1988 | Weiss | |
| 4,758,718 A * | 7/1988 | Fujisaki et al. | 235/487 |
| 4,786,791 A | 11/1988 | Hodama | |
| 4,791,283 A | 12/1988 | Burkhardt | |
| 4,814,591 A | 3/1989 | Nara et al. | |
| 4,819,267 A | 4/1989 | Gargile et al. | |
| 4,849,613 A | 7/1989 | Eisele | |
| 4,856,062 A | 8/1989 | Weiss | |
| 4,868,376 A | 9/1989 | Lessin et al. | |
| 4,885,778 A | 12/1989 | Weiss | |
| 4,926,480 A | 5/1990 | Chaum | |
| 4,942,173 A | 7/1990 | Casida et al. | |
| 4,972,476 A | 11/1990 | Nathans | |
| 4,998,279 A | 3/1991 | Weiss | |
| 5,020,105 A | 5/1991 | Rosen et al. | |
| 5,040,223 A | 8/1991 | Kamiya et al. | |
| 5,056,141 A | 10/1991 | Dyke | |
| 5,065,429 A | 11/1991 | Lang | |
| 5,120,939 A | 6/1992 | Claus et al. | |
| 5,131,038 A | 7/1992 | Puhl et al. | |
| 5,168,275 A | 12/1992 | Harrison et al. | |
| 5,280,527 A | 1/1994 | Gullman et al. | |
| 5,434,398 A | 7/1995 | Goldberg | |
| 5,473,144 A | 12/1995 | Mathurin, Jr. | |
| 5,477,210 A | 12/1995 | Belcher | |
| 5,530,232 A * | 6/1996 | Taylor | 235/380 |
| 5,548,106 A | 8/1996 | Liang et al. | |
| 5,578,808 A | 11/1996 | Taylor | |
| 5,623,552 A * | 4/1997 | Lane | 382/124 |
| 5,627,355 A | 5/1997 | Rahman et al. | |
| 5,732,148 A | 3/1998 | Keagy et al. | |
| 5,789,732 A | 8/1998 | McMahon et al. | |
| 5,794,218 A | 8/1998 | Jennings et al. | |
| 5,834,747 A | 11/1998 | Cooper | |
| 5,838,059 A | 11/1998 | Inoue et al. | |
| 5,907,142 A * | 5/1999 | Kelsey | 235/380 |
| 5,907,149 A | 5/1999 | Marckini | |
| 5,943,624 A | 8/1999 | Fox et al. | |
| 5,982,628 A | 11/1999 | Houdeau et al. | |
| 5,991,749 A | 11/1999 | Morrill, Jr. | |
| 5,996,897 A | 12/1999 | Prancz | |
| 6,012,636 A | 1/2000 | Smith | |
| 6,019,284 A | 2/2000 | Freeman et al. | |
| 6,089,451 A * | 7/2000 | Krause | 235/380 |
| 6,095,416 A | 8/2000 | Grant et al. | |
| 6,104,922 A * | 8/2000 | Baumann | 455/410 |
| 6,134,130 A | 10/2000 | Connell et al. | |
| 6,169,929 B1 | 1/2001 | Isso et al. | |
| 6,172,609 B1 | 1/2001 | Lu et al. | |
| 6,206,293 B1 | 3/2001 | Gutman et al. | |
| 6,308,890 B1 | 10/2001 | Cooper | |
| 6,327,376 B1 | 12/2001 | Harkin | |
| 6,340,116 B1 * | 1/2002 | Cecil et al. | 235/492 |
| 6,398,115 B2 | 6/2002 | Krause | |
| 6,434,403 B1 | 8/2002 | Ausems et al. | |
| 6,470,451 B1 | 10/2002 | Weinstein | |
| 6,507,130 B1 * | 1/2003 | Thuringer et al. | 307/70 |
| 6,507,912 B1 | 1/2003 | Matyas et al. | |
| 6,547,130 B1 | 4/2003 | Shen | |
| 6,588,660 B1 | 7/2003 | Buescher et al. | |
| 6,604,658 B1 | 8/2003 | Young et al. | |
| 6,607,127 B2 | 8/2003 | Wong | |
| 6,705,520 B1 * | 3/2004 | Pitroda et al. | 235/382.5 |
| 6,715,679 B1 | 4/2004 | Infosino | |
| 6,811,082 B2 * | 11/2004 | Wong | 235/451 |
| 6,848,617 B1 | 2/2005 | Fries et al. | |
| 6,877,097 B2 | 4/2005 | Hamid et al. | |
| 6,980,672 B2 | 12/2005 | Saito et al. | |
| 6,991,155 B2 | 1/2006 | Burchette, Jr. | |
| 7,046,746 B1 | 5/2006 | Keaney et al. | |
| 7,090,126 B2 | 8/2006 | Kelly et al. | |
| 7,127,088 B1 | 10/2006 | Grajewski et al. | |
| 2001/0011684 A1 | 8/2001 | Krause | |
| 2001/0027439 A1 | 10/2001 | Holtzman et al. | |
| 2002/0003169 A1 | 1/2002 | Cooper | |
| 2002/0043566 A1 * | 4/2002 | Goodman et al. | 235/492 |
| 2002/0073042 A1 | 6/2002 | Maritzen et al. | |
| 2002/0095587 A1 | 7/2002 | Doyle et al. | |
| 2002/0095588 A1 | 7/2002 | Shigematsu et al. | |
| 2002/0097144 A1 | 7/2002 | Collins et al. | |
| 2002/0132664 A1 | 9/2002 | Miller et al. | |
| 2002/0138735 A1 * | 9/2002 | Felt et al. | 713/176 |
| 2002/0163421 A1 | 11/2002 | Wang et al. | |
| 2002/0194476 A1 | 12/2002 | Lewis et al. | |
| 2003/0046228 A1 | 3/2003 | Berney | |
| 2003/0046554 A1 * | 3/2003 | Leydier et al. | 713/186 |
| 2003/0220841 A1 | 11/2003 | Maritzen | |
| 2004/0050930 A1 | 3/2004 | Rowe | |
| 2005/0001711 A1 * | 1/2005 | Doughty et al. | 340/5.74 |
| 2006/0283958 A1 * | 12/2006 | Osterweil | 235/492 |

FOREIGN PATENT DOCUMENTS

| | | |
|---|---|---|
| EP | 1 061 482 | 12/2000 |
| WO | 98 12670 | 3/1998 |
| WO | 99 56429 | 11/1999 |
| WO | 01 35334 | 5/2001 |
| WO | 01 59686 | 8/2001 |
| WO | 01 75488 | 11/2001 |
| WO | 01 88859 | 11/2001 |

OTHER PUBLICATIONS

International Search Report and Written Opinion for PCT/US2003/009393 dated Jun. 19, 2003.

Biometric Associates, Inc. web page; http://www.biometricassociates.com/html.

Biometric Associates, Inc. web page; http://www.biometricassociates.com/products.html.

Biometric Associates, Inc. web page; http://www.biometricassociates.com/products2.html.

EPO Search Report issued by the European Patent Office on Jul. 28, 2005 in EP Application No. 03745633.2.

Menezes, A.J., "Handbook of Applied Cryptography," CRC Press, Boca Raton, Florida, (1997), pp. 321-322, 330-331 and 386-390.

Kisner, W., "Smart Cards," Department of Electrical & Computer Engineering, University of Manitoba, Oct. 1999.

Kuhn, et al., "Soft Tempest: Hidden Data Transmission Using Electromagnetic Emanations," LNCS (1998), 1525:124-142.

AN678—RFID Coil Design, Application Notes—Details, Sep. 29, 1998.

International Search Report and Written Opinion for PCT/US2007/004756 dated Jul. 16, 2008.

* cited by examiner

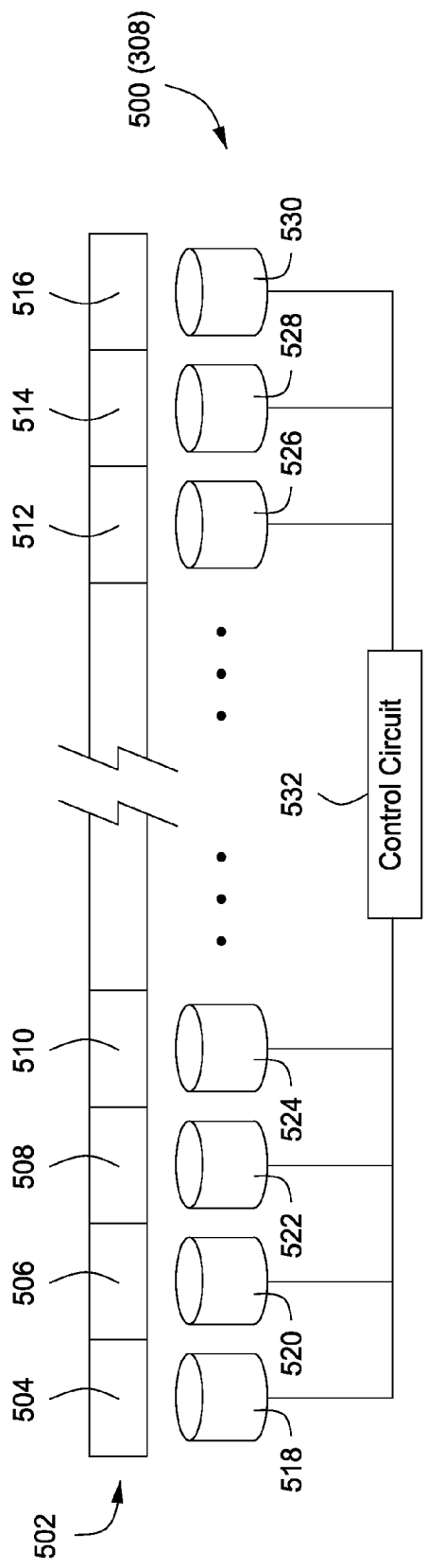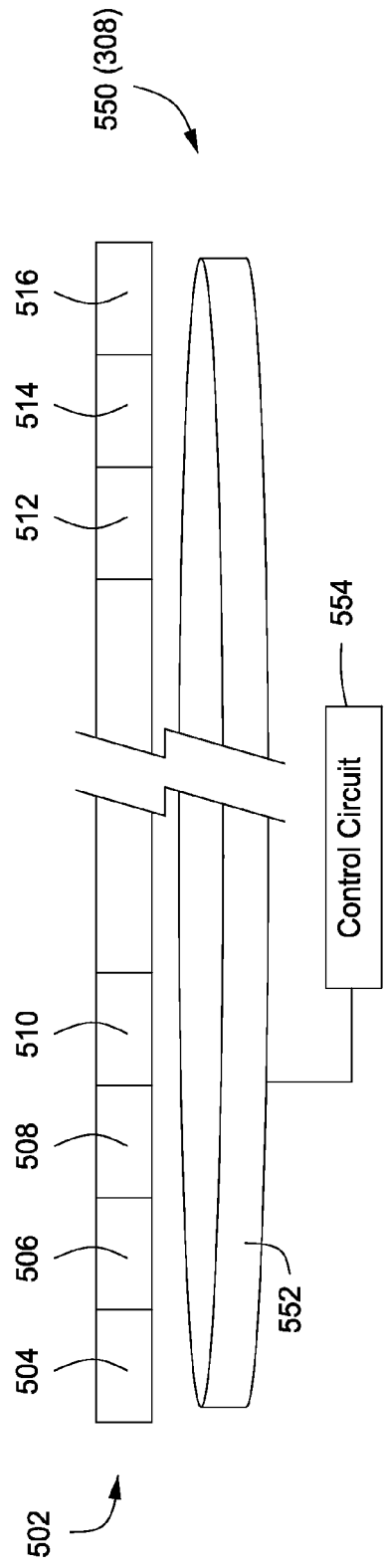

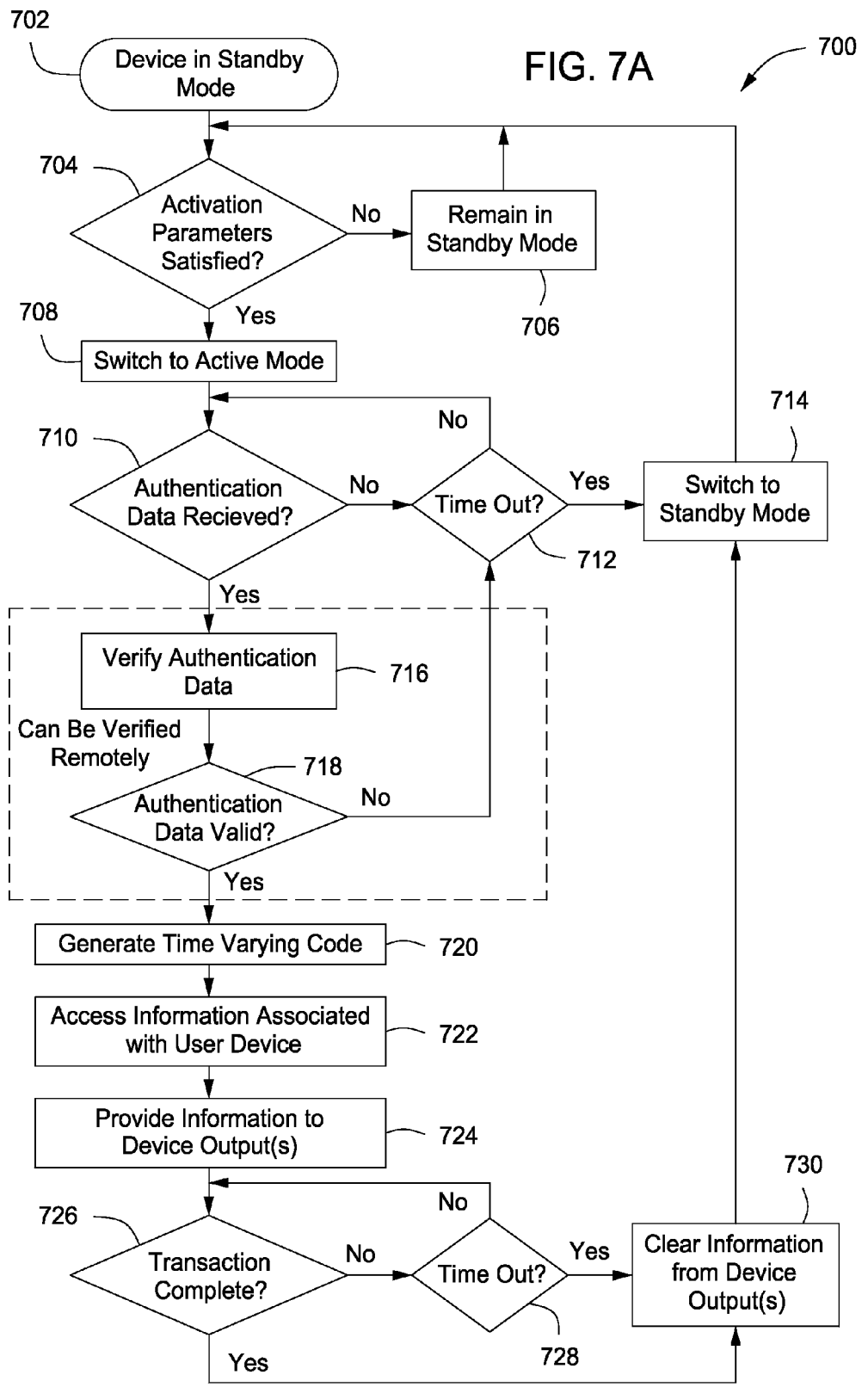

SYSTEM, METHOD AND APPARATUS FOR ENABLING TRANSACTIONS USING A USER ENABLED PROGRAMMABLE MAGNETIC STRIPE

PRIORITY CLAIM

This patent application is a continuation-in-part of U.S. patent application Ser. No. 10/680,050 filed on Oct. 7, 2003, now U.S. Pat. No. 8,015,592, which is a continuation-in-part of U.S. patent application Ser. No. 10/400,306 filed on Mar. 27, 2003, now U.S. Pat. No. 7,337,326, which is a non-provisional patent application of U.S. provisional patent application Ser. No. 60/368,363 filed on Mar. 28, 2002.

TECHNICAL FIELD OF THE INVENTION

The present invention relates generally to the field of electronic devices and equipment used in the authentication and processing of commercial and security related transactions and, more particularly, to a system, method and apparatus for enabling transactions using user enabled programmable magnetic stripes.

BACKGROUND OF THE INVENTION

The security of current magnetic stripe cards is suspect due to the ease of card theft and 'skimming' of card data for creating and using fake cards. As shown in FIG. 1, current magnetic stripe cards 100, such as access, credit, debit, identification, security, stored value and vendor-specific cards, typically have a strip of magnetic material 102, which is commonly referred to as a magnetic stripe, embedded in a plastic or laminated substrate 104. This magnetic stripe 102 carries data for the cardholder, such as name, account number, card expiration date, and other important information. This information is typically stored in three data tracks within the magnetic stripe 102 that carry a pattern of magnetization, which is a magnetic representation of the stored information. Other common features of magnetic stripe cards 100 that are well known to those skilled in the art, such as the cardholder's name, account number, expiration date, issuer, signature stripe, validation code, photograph, etc., are not shown. The magnetic patterns on the magnetic stripes 102 are easily created, read and damaged. As a result, the security of cards 100 that rely solely on magnetic stripes 102 for information storage and authentication is low and renders their use in applications involving highly sensitive information suspect. These types of cards are easily stolen and/or the data is "skimmed" for the creation and use of fake or counterfeit cards.

One way to increase the security of information bearing cards is the use of smart cards, also referred to as chip cards. Although smart cards 200 may also include a magnetic stripe, they primarily rely on an integrated circuit, also commonly referred to as a controller or processor, embedded within the plastic or laminated substrate 204 below the terminals 202 to store the cardholder's information as shown in FIG. 2. The integrated circuit is communicably coupled to a set of metallic terminals 202 that are designed to interface with a special reader. Other common features of smart cards 200 that are well known to those skilled in the art, such as the cardholder's name, account number, expiration date, issuer, signature stripe, validation code, photograph, etc., are not shown. A smart card 200 is capable of incorporating multiple applications or accounts on a single card or other media. As a result, smart cards 200 are widely recognized as a viable way to improve the effectiveness and security of a given card or device. Such smart cards 200 require a different reader from the standard magnetic stripe readers that currently make up virtually the entire card reader infrastructure throughout the world. As a result, the acceptance and wide-spread use of "true" smart cards (without a magnetic stripe) has been slow.

Various compromise technologies have been developed that incorporate some of the flexibility and security features of smart cards into a magnetic stripe card using either an adapter or a programmable magnetic stripe. For example, a smart card to magnetic stripe adapter is disclosed in US Patent Application Publication 2003/0057278 A1 published on Mar. 27, 2003 entitled "Advanced Magnetic Stripe Bridge (AMSB)" by Jacob Y. Wong. The Wong patent application describes an adapter or bridge that is used with magnetic stripe card readers such that a smart card or other card without a magnetic stripe can be placed into the bridge and electrically connected to the card. The bridge has one edge that is the size of a credit card so that the bridge can be swiped through the magnetic stripe reader while the card is still in the bridge. With this link in place, the data from the card is transmitted from the on-card processor through the bridge in a format that emulates the data generated by swiping the track(s) of a typical magnetic card through a magnetic stripe reader. As a result, the magnetic stripe reader is able to accept data from the magnetic stripe-less card. Similarly, one developer, ViVOTech, Inc., places a fixed bridge in the magnetic stripe reader that is capable of receiving radio frequency ("RF") data and then emulates the feed of data into the magnetic stripe reader via RF to complete the transaction without requiring physical contact of the card with the reader. Both of these technologies require either a fixed or mobile adaptor to be added to the card-reader infrastructure to enable data to be read from the card. While this is possible, it is still a modification to the world-wide infrastructure that is undesirable for unfettered use of the card. The use of such a bridge is cumbersome, adds cost and reduces reliability. In addition, this method also does not incorporate authentication of the user to provide protections against skimming or use by unauthorized individuals.

The use of a programmable magnetic stripe is disclosed in US Patent Application Publication 2002/0003169 A1 published on Jan. 10, 2002 entitled "Universal Credit Card Apparatus and Method" by J. Carl Cooper. The Cooper patent application describes a card in which a number of electrical coils are built into the card with one coil under each data bit on the magnetic stripe on the card so that each coil, when excited under the control of the on-card processor, creates a magnetic field that can magnetize the data bit in the magnetic track to be either a 0 or 1, thereby yielding a binary code that, when applied in accordance with the ISO standard for magnetic stripe cards, can be read by standard card readers. With this on-card capability in place, the processor can essentially "write" any data stored in the processor's memory to the on-card magnetic stripe. As with the adapter, the Cooper patent application does not provide any protections against card skimming or use by unauthorized persons. Moreover, because of the need for numerous individual coils (one beneath each data bit on the magnetic stripe), significant cost is incurred when adding these coils to the on-card design. The power requirements of such a card are also problematic.

There is, therefore, a need for a practical and secure card that has the advantages of a smart card and will interface with magnetic stripe readers without the use of adapters. Moreover, there is a need for a proper authentication in multiple account/application cards and devices to reduce the risk to the device holder in the event of loss or fraudulent capture of the data within the multiple accounts on the device.

SUMMARY OF THE INVENTION

The present invention provides a system, method and apparatus for a practical and secure card or device that has the advantages of a smart card and will interface with existing world-wide magnetic stripe readers without the use of adapters or bridges. Moreover, the present invention allows for proper authentication in multiple account/application cards and devices to reduce the risk to the device holder due to loss of the device or fraudulent capture of the data within the multiple accounts on the device. Additional security is provided by generating a time varying code that is not predictable and can be verified by the system. As a result, the present invention provides a secure and flexible system for security and/or commercial transactions using access, credit, debit, identification, security, stored value and vendor-specific cards and/or devices.

The present invention as described herein provides stringent protections for magnetic stripe cards and devices through the use of on-card/device generation of time varying codes to authenticate the user and programmable magnetic stripes such that the data within the tracks of the stripe can be spatially manipulated and managed by the logic within the processor/controller of the card or device. This allows magnetic stripe data to be modified or completely erased for protection of the cardholder, and then re-created on-demand by the programmable features built into the card or device. Alternatively, the data can be stored in the on-card processor/controller and then transmitted via time-varying signal to the card reader thereby emulating the swipe of a traditional magnetic stripe through the magnetic card reader. In addition, the card or device can provide such information via a contactless communication system. These capabilities also enable multiple sets of data and applications to be incorporated onto a single card, device or media, thereby making it a universal card/device with numerous sets of data (e.g., accounts) and/or applications that can be temporarily downloaded onto the magnetic stripe from the memory of the on-card processor, used in the desired application, and then modified or erased. Finally, some or all of the above features can be disabled until the owner of the card enables them through use of an on-card biometrics sensor and logic that is pre-registered to the cardholder. As a result, maximum security is guaranteed since the card cannot be used if it is lost or stolen, and skimming can be virtually eliminated by prompt modification or erasure of the magnetic stripe data following the basic transaction authorized by the owner.

The present invention provides an apparatus or user device that includes a substrate, a magnetic field generator disposed within the substrate that is normally inactive, an initiator mounted on the substrate, a memory disposed within the substrate and a processor disposed within the substrate that is communicably coupled to the magnetic field generator, the initiator and the memory. The processor is operable to process information received from the initiator, generate a time varying code in response to the received information and activate the magnetic field generator. A power source is also disposed within the substrate and electrically connected to the magnetic field generator, the initiator and the processor. The magnetic field generator can create a spatial magnetic signal using a magnetic stripe and one or more induction coils, or create a time-varying magnetic signal for emulating data obtained from swiping a traditional magnetic stripe card through a magnetic card reader. As a result, the magnetic field generator emulates a programmable magnetic stripe.

The initiator may include a biometric sensor (e.g., a fingerprint sensor, retina sensor, iris sensor, signature, DNA sensor or voice sensor, etc.) that provides biometric information, a user interface (e.g., a touch pad, one or more buttons, a display and a voice sensor, etc.) that provides user information and/or one or more commands, or a combination thereof. The processor generates the time varying code using an algorithm, one or more static variables (e.g., the biometric information, a reproducible artifact from the biometric information, a cardholder's name, an account number, an expiration date, a issuer, a validation code, a secret code associated with the apparatus, a personal identification number, or a combination thereof) and one or more dynamic variables (e.g., a date and time, a time interval, or a combination thereof). In addition, the time varying code can be encrypted, modified by access information associated with the user (e.g., the biometric information, a reproducible artifact from the biometric information, a cardholder's name, an account number, an expiration date, a issuer, a validation code, a secret code associated with the apparatus, a personal identification number, or a combination thereof) or a combination thereof.

The present invention also provides a method for enabling a transaction using an apparatus containing information associated with one or more users, a magnetic field generator that is normally inactive and an initiator. The method includes the steps of receiving information from the initiator, generating a time varying code in response to the received information, and activating the magnetic field generator and generating a magnetic signal corresponding to the information associated with the one or more users. The method can be performed by a computer program, such as middleware, embodied in a computer readable medium wherein each step is implemented as one or more code segments.

In addition, the present invention provides a system having one or more user devices, one or more system interfaces operable to communicate with the user device and a system processor communicably coupled to the one or more system interfaces. Each user device includes a substrate, a magnetic field generator disposed within the substrate that is normally inactive, an initiator mounted on the substrate, a memory disposed within the substrate and a device processor disposed within the substrate and communicably coupled to the magnetic field generator, the initiator and the memory. The device processor is operable to process information received from the initiator, generate a time varying code in response to the received information and activate the magnetic field generator when the user is verified. The user device also includes a power source disposed within the substrate and electrically connected to the magnetic field generator, the initiator and the device processor.

BRIEF DESCRIPTION OF THE DRAWINGS

For a more complete understanding of the features and advantages of the present invention, reference is now made to the detailed description of the invention along with the accompanying figures in which corresponding numerals in the different figures refer to corresponding parts and in which:

FIG. 5A depicts a block diagram of a programmable magnetic stripe using multiple inductive coils in accordance with one embodiment of the present invention;

FIG. 5B depicts a block diagram of a programmable magnetic stripe using a single induction coil for sending emulated time-varying magnetic stripe data to a magnetic card reader directly from the on-card controller in accordance with another embodiment of the present invention;

FIGS. 7A, 7B, 7C and 7D are flow charts of an exemplary authentication method for using a device in accordance with the present invention;

DETAILED DESCRIPTION OF ILLUSTRATIVE EMBODIMENTS

Figure 1:
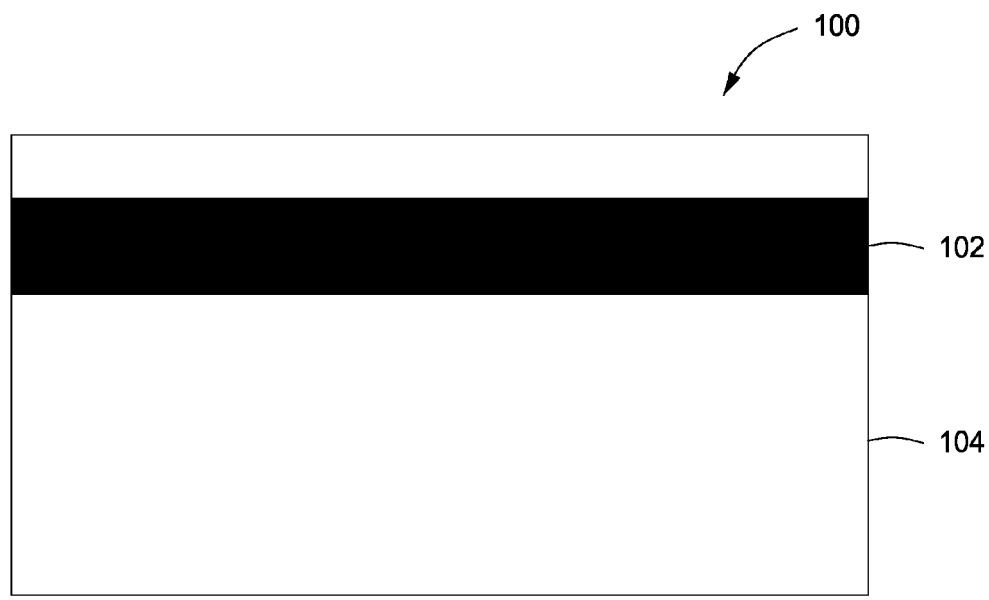
FIG. 1 depicts a standard credit card with a magnetic stripe in accordance with the prior art.
Figure 2:
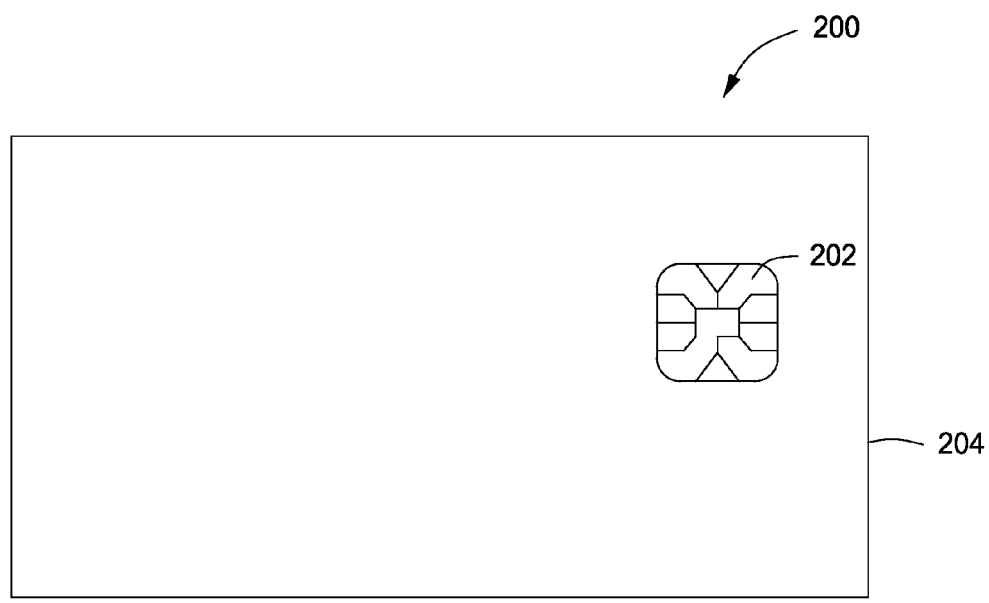
FIG. 2 depicts a smart card in accordance with the prior art.

While the production and application of various embodiments of the present invention are discussed in detail below in relation to authentication and processing of commercial and security related transactions, it should be appreciated that the present invention provides many applicable inventive concepts that may be embodied in a wide variety of specific contexts. The specific embodiments discussed herein are merely illustrative of specific ways to make and use the invention and do not delimit the scope of the invention.

The present invention provides a system, method and apparatus for a practical and secure card or device that has the advantages of a smart card and will interface with existing world-wide magnetic stripe readers without the use of adapters or bridges. Moreover, the present invention allows for proper authentication in multiple account/application cards and devices to reduce the risk to the device holder due to loss of the device or fraudulent capture of the data within the multiple accounts on the device. Additional security is provided by generating a time varying code that is not predictable and can be verified by the system. As a result, the present invention provides a secure and flexible system for security and/or commercial transactions using access, credit, debit, identification, security, stored value and vendor-specific cards and/or devices.

The present invention as described herein provides stringent protections for magnetic stripe cards and devices through the use of on-card/device generation of time varying codes to authenticate the user and programmable magnetic stripes such that the data within the tracks of the stripe can be spatially manipulated and managed by the logic within the processor/controller of the card or device. This allows magnetic stripe data to be modified or completely erased for protection of the cardholder, and then re-created on-demand by the programmable features built into the card or device. Alternatively, the data can be stored in the on-card processor/controller and then transmitted via time-varying signal to the card reader thereby emulating the swipe of a traditional magnetic stripe through the magnetic card reader. In addition, the card or device can provide such information via a contactless communication system. These capabilities also enable multiple sets of data and applications to be incorporated onto a single card, device or media, thereby making it a universal card/device with numerous sets of data (e.g., accounts) and/or applications that can be temporarily downloaded onto the magnetic stripe from the memory of the on-card processor, used in the desired application, and then modified or erased. Finally, some or all of the above features can be disabled until the owner of the card enables them through use of an on-card biometrics sensor and logic that is pre-registered to the cardholder. As a result, maximum security is guaranteed since the card cannot be used if it is lost or stolen, and skimming can be virtually eliminated by prompt modification or erasure of the magnetic stripe data following the basic transaction authorized by the owner.

Figure 3:
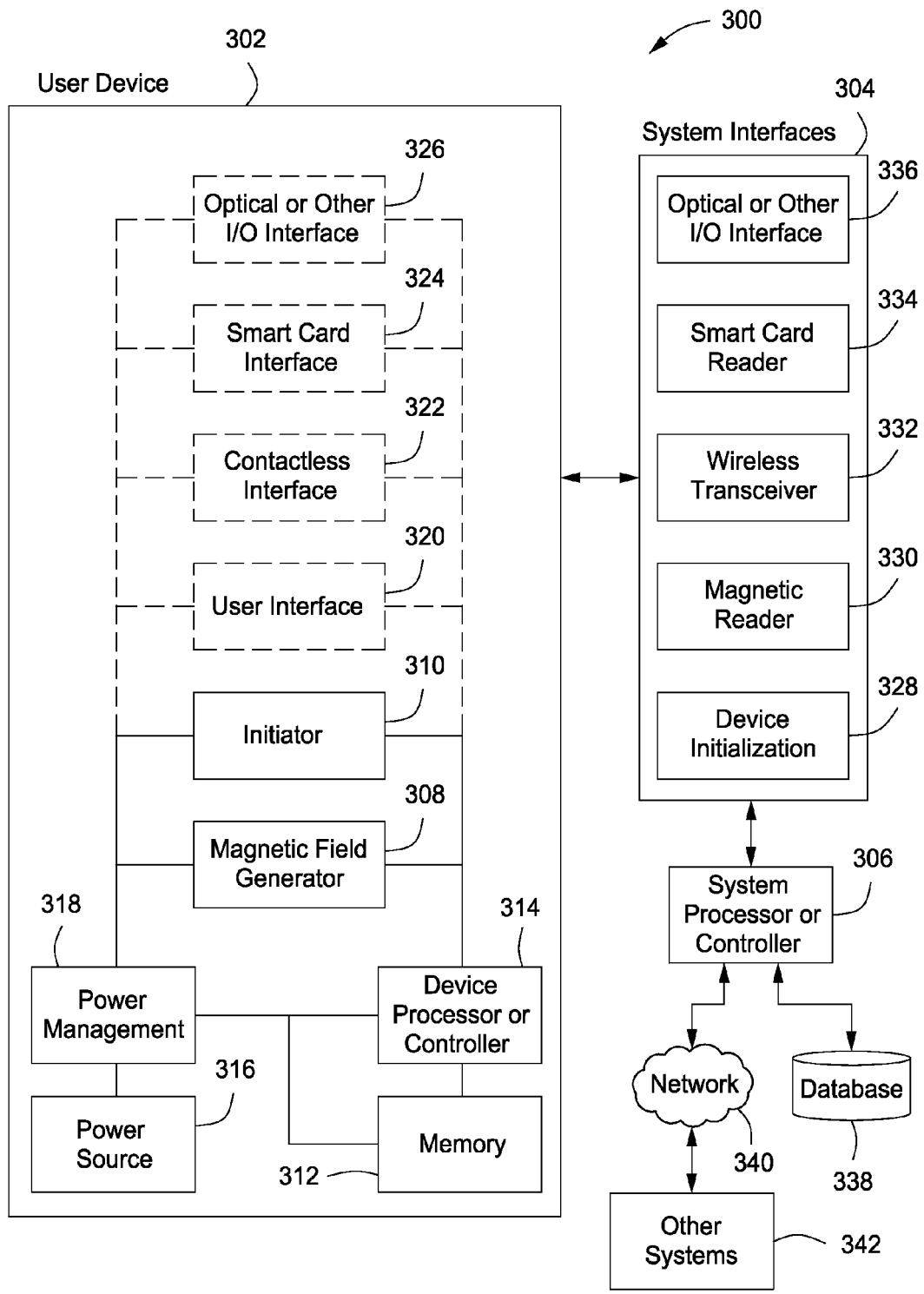
FIG. 3 depicts a block diagram of a system for enabling transactions in accordance with one embodiment of the present invention.

Now referring to FIG. 3, a block diagram of a system 300 for enabling transactions in accordance with one embodiment of the present invention is shown. More specifically, the present invention provides a system 300 having one or more user devices 302, one or more system interfaces 304 operable to communicate with the user device(s) 302 and a system processor or controller 306 communicably coupled to the one or more system interfaces 304. Each user device 302 includes a magnetic field generator 308 that is normally inactive, an initiator 310, a memory 312, a device processor or controller 314 and a power source 316. Note that the memory 312 and device processor 314 may be integrated into a single integrated circuit. The device processor 314 may also include a smart card processor and an application specific integrated circuit ("ASIC") chip. In addition, the power source 316 may be controlled by a power management unit 318. The magnetic field generator 308, initiator 310 and memory 312 are all communicably coupled to the device processor 314. The magnetic field generator 308, initiator 310, memory 312 and device processor 314 are all electrically connected to the power source 316 via the power management unit 318. If the user device 302 does not include a power management unit 318, the magnetic field generator 308, initiator 310, memory 312 and device processor 314 will all be electrically connected to the power source 316. The device processor 314 is operable to process information received from the initiator 310, generate a time varying code in response to the received information and activate the magnetic field generator 308.

The initiator 310 may include a biometric sensor (e.g., a fingerprint sensor, retina sensor, iris sensor, signature, DNA sensor or voice sensor, etc.) that provides biometric information, a user interface 320 (e.g., a touch pad, one or more buttons, a display and a voice sensor, etc.) that provides user information and/or one or more commands, or a combination thereof. The device processor 314 generates the time varying code using an algorithm, one or more static variables (e.g., the biometric information, a reproducible artifact from the biometric information, a cardholder's name, an account number, an expiration date, a issuer, a validation code, a secret code associated with the apparatus, a personal identification number, or a combination thereof) and one or more dynamic variables (e.g., a date and time, a time interval, or a combination thereof) (See FIGS. 7B and 7C). In addition, the time varying code can be encrypted, modified by access information associated with the user (e.g., the biometric information, a reproducible artifact from the biometric information, a cardholder's name, an account number, an expiration date, a issuer, a validation code, a secret code associated with the apparatus, a personal identification number, or a combination thereof) or a combination thereof.

The magnetic field generator 308 emulates a programmable magnetic stripe by either creating a spatial magnetic signal or a time-varying magnetic signal for emulating data obtained from swiping a traditional magnetic stripe card through a magnetic card reader (See FIG. 5B). The spatial magnetic signal is created using a magnetic stripe either mounted on the substrate or disposed within the substrate, one or more induction coils disposed within the substrate underneath the magnetic stripe, and a controller disposed within the substrate that is connected to the one or more induction coils and operable to generate a magnetic signal via the one or more induction coils and the magnetic stripe (See FIG. 5B). In either case, the magnetic signal includes binary data to enable a transaction, such as a user name, user number, device expiration date, transaction approval/denial, etc. A typical magnetic stripe contains three-tracks wherein each track contains a set of magnetic data cells. Note that the magnetic field generator 308 may be configured to read a magnetic stripe from another device so that device 302 can replace the other device. The information read from the magnetic stripe would be stored in memory 312 for later transmission by the magnetic field generator 308 upon proper authentication.

As previously described, the initiator 310 may include a biometric sensor, such as a fingerprint sensor, retina sensor, iris sensor, signature, DNA sensor, voice sensor or other sensor device capable of detecting unique characteristics of a person that can then be compared to stored data. One example of such a fingerprint sensor includes a matrix of points operable to detect high and low points corresponding to ridges and valleys of a fingerprint. Another example of a fingerprint sensor includes an emitter and a detector wherein light projected by the emitter is reflected from a user's finger onto the detector.

When the device 302 having a biometric sensor (initiator 310) is initialized or linked to a user, the initiator 310 is used to collect biometric information about the user. This biometric information is stored as a biometric analog of the user in the memory 312. Thereafter, and as will be described below in reference to FIGS. 7A and 7D, biometric information or authentication data is obtained by the initiator 310 and sent to the device processor 314 for authentication or sent to a remote system processor 306 for authentication. The device processor 314 or system processor 306 determines whether the authentication data is valid for one of the users by comparing the authentication data to the biometric template stored in memory 312 or database 338. When the authentication is performed on the user device 302, if the authentication data is valid, the device processor 314 activates the magnetic field generator 308 and provides binary data to the magnetic field generator 308 to be transmitted as a magnetic signal. The magnetic field generator 308 then generates the magnetic signal corresponding to the information associated with the authenticated user, the selected application and the time varying code. The device processor 314 will then deactivate the magnetic field generator 308 after the magnetic field generator 308 has been active for a specified period of time. Alternatively, the device processor 314 may deactivate the magnetic field generator 308 when the initiator 310 no longer detects the authorized user, or a transaction complete signal is received. When the authentication is performed by the system processor or controller 306, the device processor 314 activates the magnetic field generator 308 and provides binary data to the magnetic field generator 308 to be transmitted as a magnetic signal. The magnetic field generator 308 then generates the magnetic signal corresponding to the information associated with the user, the authentication information, the selected application and the time varying code. The present invention reduces power consumption of the device 302 and increases security by (1) keeping the magnetic field generator 308 normally inactive, (2a) activating the magnetic field generator 308 and transmitting the magnetic signal only after the user has been authenticated when the authentication is performed on the user device 304, (2b) saving the power overhead of the authentication process by transmitting the required information to the system processor or controller 306 for authentication, and (3) disabling the magnetic field generator sometime thereafter. Additional power consumption can be reduced by keeping the device 302 in a sleep or low power mode until certain activation parameters have been satisfied, such as receiving an external signal, contact with the initiator 310 or a user input/command.

The power source 316 may include a battery, a piezoelectric generator, a solar panel, an electromagnetic energy converter (such as used in passive Radio Frequency Identification ("RFID") systems), a kinetic energy converter or any combination thereof. For example, the power source 316 may include a battery, a power generator, a converter and a multiplexer. The converter is electrically connected to the power generator and operable to convert power received from the power generator into power usable by the device 302 or to charge the battery. The battery management unit 318 is connected to the battery. The power multiplexer is connected to the battery management unit 318 and the converter. The power multiplexer is operable to determine whether to draw power from the battery management unit, from the converter, or from both.

The device 302 may also include a user interface 320 that is communicably coupled to the device processor 314 and electrically connected to the power source 316 (via power management unit 318). The user interface 320 may include a touch pad, one or more buttons, a display, a voice sensor or other known user interfaces. The device 302 may also include a contactless interface 322 that is communicably coupled to the device processor 314 and electrically connected to the power source 316 (via power management unit 318). The contactless interface 322 may include an antenna for wireless communication, an optical transceiver, a sonic transceiver, a transceiver in the electromagnetic spectrum or other known contactless communication methods. In addition, device 302 may also include a smart card interface 324 that is communicably coupled to the device processor 314 and electrically connected to the power source 316 (via power management unit 318). Moreover, device 302 may include an optical or other type of input/output (I/O) interface 326 that is communicably coupled to the device processor 314 and electrically connected to the power source 316 (via power management unit 318).

The components of the device 302 are typically disposed within or mounted on a substrate. For example, the initiator 310, user interface 320, smart card interface 324 and optical or other I/O interface 326 are typically mounted on the substrate; whereas the memory 312, device processor 314, power source 316 and power management unit 318 are typically disposed within the substrate. The magnetic field generator 308 and contactless interface 322 can be mounted on the substrate or disposed within the substrate. The type of material used for the substrate and the resulting properties of the substrate will depend on the desired application and working environment for the device 302. In many cases, the substrate will be a semi-flexible material, such as plastic, or a laminate material. The substrate can then be integrated into a card, such as an access card, a credit card, a debit card, an identification card, a drivers license, a firearm license, a physical access security card, a mini-card, a security card, a stored value card and a vendor-specific card, etc. The substrate may also be integrated into a travel credential, such as a passport, an immigration card and a visa, etc. In addition, the substrate may be integrated into a personal communication device, such as a personal data assistant (PDA), a telecommunications device, a pager, a computer and an electronic mail transceiver, etc. Moreover, the substrate may be integrated into a personal device/belonging, such as a watch, a jewelry, a key ring, a tag and eye glasses, etc.

The one or more system interfaces 304 may include a device initialization interface 328, a magnetic reader 330, a wireless communications interface (transceiver) 332, a smart card reader 334, or an optical or other input/output interface 336. The one or more system interfaces 304 are used to communicate with the user device 302 physically or contactlessly, depending on the desired application and implementation. Other non-system interfaces may include a battery recharger, personal computer interface or personal data assistant (PDA). The one or more system interfaces 304 are communicably coupled to a system processor or controller 306, which in turn may be communicably coupled to a database 338 or one or more remote systems or computers 342 via a network 340. Network 340 may be a local area network or wide area network, such as the Internet.

Figure 4A:
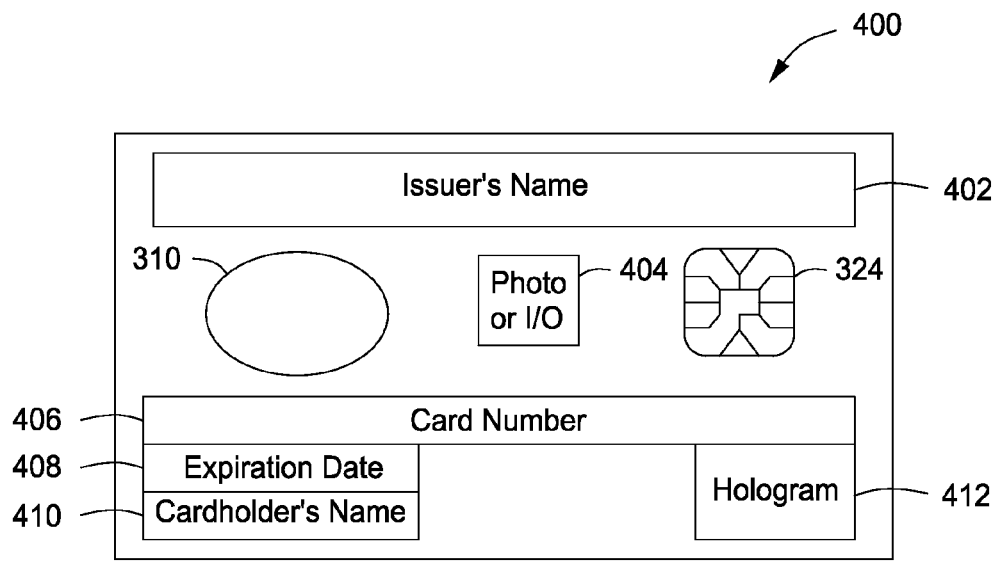
FIG. 4A depicts the front of an exemplary embodiment of a card for enabling transactions using a user enabled programmable magnetic stripe in accordance with the present invention.

Referring now to FIG. 4A, the front 400 of an exemplary embodiment of a card for enabling transactions using a user enabled programmable magnetic stripe in accordance with the present invention is shown. The card is shown in the form of a credit or debit card, but may also be used as an access card, an identification card, a drivers license, a firearm license, a physical access security card, a mini-card, a security card, a stored value card and a vendor-specific card, etc. The front 400 of the card includes the issuer's name 402, an initiator 310, a photo or I/O interface 404 (user interface 320 or other I/O interface 326), a smart card interface 324, a card number 406, an expiration date 408, the card holder's name 410 and a hologram 412. Other information and features may also be placed on or within the card. As will be appreciated by those skilled in the art, the features described above can be rearranged or eliminated to fit a specific application for the card.

Figure 4B:
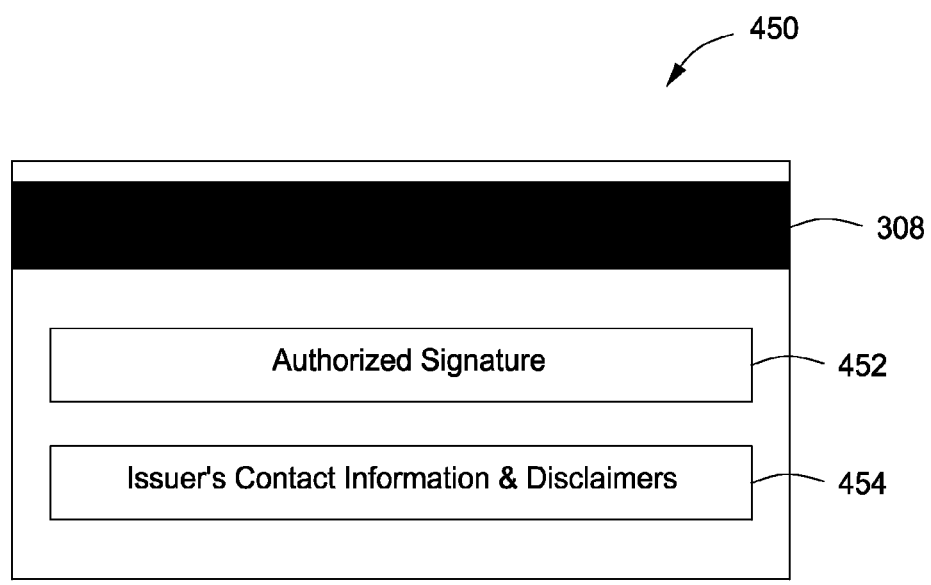
FIG. 4B depict the back of an exemplary embodiment of a card for enabling transactions using a user enabled programmable magnetic stripe in accordance with the present invention.

Now referring to FIG. 4B, the back 450 of an exemplary embodiment of a card for enabling transactions using a user enabled programmable magnetic stripe in accordance with the present invention is shown. The back 450 of the card includes the magnetic field generator 308 (programmable magnetic stripe), an area for the card holder to place an authorized signature 452 and the issuer's contact information and disclaimers 454. Other information and features may also be placed on or within the card. As will be appreciated by those skilled in the art, the features described above can be rearranged or eliminated to fit a specific application for the card.

Referring now to FIG. 5A, a block diagram of a programmable magnetic stripe 500 (308 FIG. 3) using multiple inductive coils 518-530 in accordance with one embodiment of the present invention is shown. The programmable magnetic stripe 500 (308 FIG. 3) includes a magnetic stripe 502, multiple inductive coils 518-530 and a control circuit 532. The magnetic stripe 502 contains one or more sets of magnetic data cells 504-516. For example, magnetic stripe 502 will typically contain three tracks or sets of magnetic data cells 504-516. The individual inductive coils 518-530 are mounted immediately beneath each of the binary magnetic data cells 504-516. Each inductive coil 518-530 is electrically connected to the control circuit 532, which may be integrated into the device processor 314 (FIG. 3). When a positive or negative current is applied to each inductive coil 518-530, it changes the polarity of the magnetized particles in the binary magnetic data cell 504-516 of the data track in the magnetic stripe 502 immediately above it, thereby creating a spatially varying binary code or magnetic signal in the magnetic stripe 502 material that can be read by standard magnetic card readers when such binary code is applied in accordance with ISO standards.

Now referring to FIG. 5B, a block diagram of a programmable magnetic stripe 550 (308 FIG. 3) using a single induction coil 552 for sending emulated time-varying magnetic stripe data to a magnetic card reader directly from the on-card controller in accordance with another embodiment of the present invention is shown. The programmable magnetic stripe 550 (308 FIG. 3) includes a magnetic stripe 502, a single inductive coil 552 and a control circuit 554. The magnetic stripe 502 contains one or more sets of magnetic data cells 504-516. For example, magnetic stripe 502 will typically contain three tracks or sets of magnetic data cells 504-516. The long inductive coil 552 is mounted immediately beneath the entire length of the magnetic stripe 502 and its corresponding binary magnetic data cells 504-516 such that a time-varying signal can be transmitted to the heads of the magnetic card reader as the card is swiped through the reader. The data rate is determined based on the minimum and maximum swipe speeds that standard readers can accommodate. In other words, the single inductive coil 552 is long enough for it to be in the physical proximity of the card reader heads for the entire time period required to transmit the time-varying signal from the card to the card reader. The inductive coil 552 is electrically connected to the control circuit 554, which may be integrated into the device processor 314 (FIG. 3). By establishing the configuration in this manner, the inductive coil 552 can be pulsed with varying currents and current directions so that the time-varying data stream of a card being swiped through the reader is emulated, thus providing the same magnetic data stream to the reader heads of the magnetic stripe reader as would be seen if a card with binary data in multiple spatially distributed data cells 504-516 in the magnetic stripe 502 were swiped through the reader. This magnetic signal will, therefore, emulate the data that would be generated by the swipe of a magnetic stripe card with the desired information embedded in the individual data cells 504-516 of the stripe 502.

Note that the individual data cells 504-516 are normally empty of data. There are several ways in which the card can be activated so that the data transfer can be started. For example, the card can be initially activated by the authorized user using an on-card "enable button", such as a low-power capacitance sensor, that can be built into the ring of the biometrics sensor 302 (FIG. 3) and used to "wake up" the card when the user is ready to authenticate himself/herself and begin using the card. Authentication of the card user is time stamped for use in determining the length of time to allow transmission of the emulated data. In addition, the magnetic reader 330 (FIG. 3) may have a start sentinel that signals a detector on the card to alert the card that it is in the presence of the card reader 330 (FIG. 3). Once the card is alerted that it is being swiped through the reader 330 (FIG. 3), it begins transmission of the emulated time-varying data from the device processor to the inductive coils 552, thereby generating an exact emulation and transmission to the reader 330 (FIG. 3) of the data that would have been produced by swiping the card through the reader 330 (FIG. 3) with spatially varying data included in the individual data cells 504-516. All such transmission of emulated card data is contingent upon valid biometric authentication of the card user, followed by detection of the card that it is in the presence of the reader head and the reader 330 (FIG. 3) has recognized the start sentinel on the card so that the reader 330 (FIG. 3) is ready to accept the stream of emulated data provided by the device processor. The transmission of data from the device processor 314 (FIG. 3) is suspended once the initial reading of data by the magnetic card reader 330 (FIG. 3) has been completed. This action prevents skimming of card information after the basic transaction has been completed.

Figure 6:
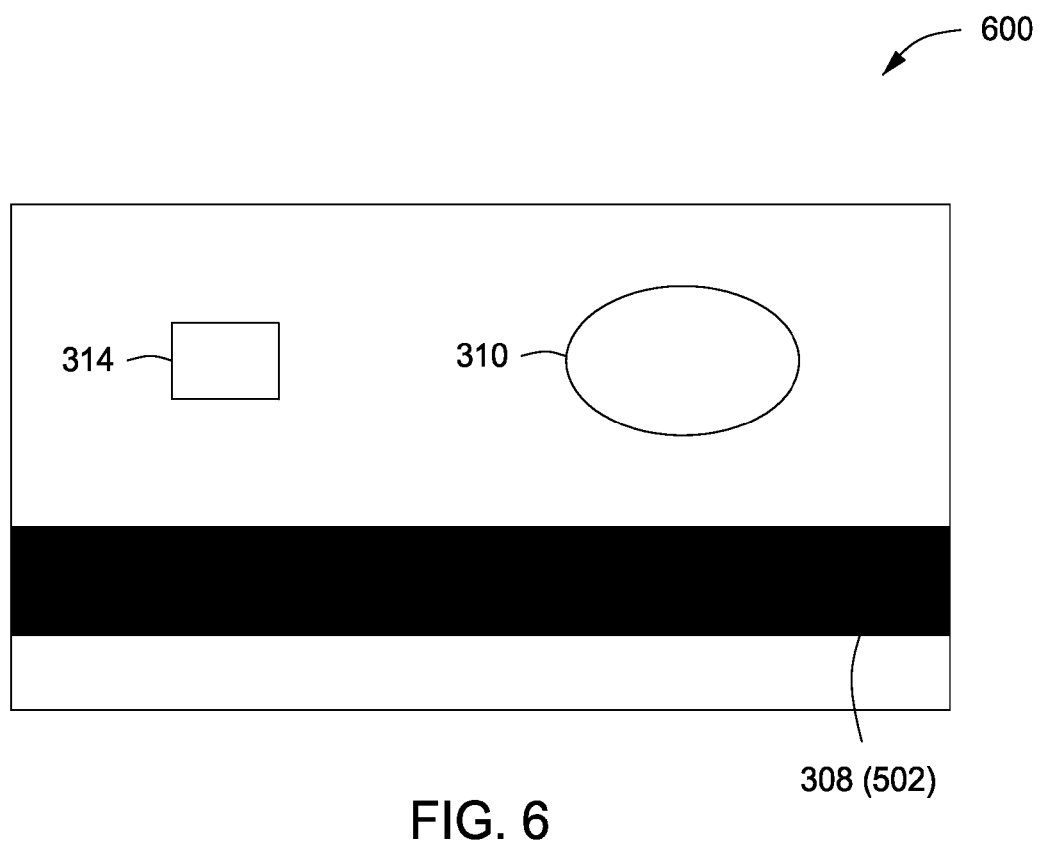
FIG. 6 depicts an exemplary embodiment of the combined elements of a user enabled programmable magnetic stripe on a device for secure physical and commercial transactions in accordance with the present invention.

Referring now to FIG. 6, a programmable magnetic card 600 is equipped with inductive coils as illustrated in FIG. 5A or 5B. An on-card biometrics sensor 310 is incorporated to enable positive authentication of the user of the card. This is accomplished by transmitting a biometrics template from the biometrics sensor 310 to the on-card control processor 314 that performs matching operations on the template sent from the biometrics sensor 310 with a template obtained from the authorized user of the card, such authorized template being resident in the control processor 314 (memory 312) from initial registration of the authorized card owner and/or user. Once such biometrics matching has been accomplished, the control processor 314 then authorizes the necessary account numbers and/or card applications to be downloaded into the individual data tracks of the programmable magnetic stripe 308 (magnetic field generator; see also 502 FIGS. 5A and 5B), which then enables the card to be used in standard card-readers throughout the existing world-wide infrastructure.

Now referring to FIG. 7A, a flow chart of an exemplary authentication method 700 for using a device, such as device 300 (FIG. 3), in accordance with the present invention is shown. The device contains information associated with one or more users, a magnetic field generator that is normally inactive and a biometric sensor. The device can be used to enable any type of transaction, such as an access transaction, a control transaction, a financial transaction, a commercial transaction or an identification transaction. The device is normally in standby or sleep mode as shown in block 702. If one or more activation parameters are satisfied, as determined in decision block 704, the device is switched to active mode in block 708. Otherwise, the device remains in standby mode as shown in block 706. The one or more activation parameters may include detecting data from the biometric sensor (e.g., initiator 310 FIG. 3), detecting an external signal from an interface (e.g., 308, 322, 324, 326 FIG. 3) or receiving data from a user interface (e.g., 320 FIG. 3). If authentication data is not received after the device is switched to active mode, as determined in decision block 710, and the active period has timed out, as determined in decision block 712, the device is switched to standby mode in block 714 and again waits for activation parameters in block 704. If, however, the active mode has not timed out, as determined in decision block 712, the device continues to wait for authentication data to be received until the active period has timed out. The present invention can be configured to authenticate the user via the user device as indicated by the dashed box around blocks 716 and 718, or send the authentication data to a remote system processor for authentication in which blocks 716 and 718 are eliminated.

In the case of authentication by the user device, if authentication data is received from the initiator, as determined in decision block 710, the authentication data is verified in block 716. The verification process determines whether the authentication data is valid for one of the users by comparing the authentication data with a stored biometric template of the one or more users that are authorized or registered to use the device. If the authentication data is not valid, as determined in decision block 718, and the active period has timed out, as determined in decision block 712, the device is switched to standby mode in block 714 and again waits for activation parameters in block 704. If, however, the active mode has not timed out, as determined in decision block 712, the device will again wait for authentication data to be received until the active period has timed out. If, however, the authentication data is valid, as determined in decision block 718, or in the case of authentication by the system device following receipt of the authentication data in block 710, a time varying code is generated in block 720, the information associated with the user is accessed in block 722 and provided to the device outputs in block 724.

The information can be a simple approval or denial of the transaction, or private information of the user that is required to enable or complete the transaction. As previously described in reference to FIG. 3, the device outputs may include a magnetic field generator 308 (programmable magnetic stripe), a contactless interface 322, a smart card interface 324, or an optical or other I/O interface 326. Using the magnetic field generator 308 for example, this step would involve activating the magnetic field generator 308 and generating a magnetic signal corresponding to the information associated with the authenticated user. In addition, the authentication step (block 716), the generate time varying code step (block 720) or the information access step (block 722) or the information output step (block 724) may also display information to the user, allow the user to select the information to enable the transaction or allow the user to select the device output or interface to be used. Once the transaction is complete, as determined in decision block 726, the information is cleared from the device output(s) in block 730, the device is switched to standby mode in block 714 and the device waits for various activation parameters in block 704. If, however, the transaction is not complete, as determined in decision block 726 and the process has not timed out, as determined in decision block 728, the process continues to wait for the transaction to be completed. If the process has timed out, as determined in decision block 728, the information is cleared from the device output(s) in block 730, the device is switched to standby mode in block 714 and the device waits for various activation parameters in block 704. The process can be set to interrupt the transaction and deny it if the process times out (e.g., the magnetic field generator has been active for a specified period of time) or the biometric sensor no longer detects the authorized user. Note that this method can be performed by a computer program, such as middleware, embodied in a computer readable medium wherein each step is implemented as one or more code segments, all of which are performed on the card/device.

Figure 7B:
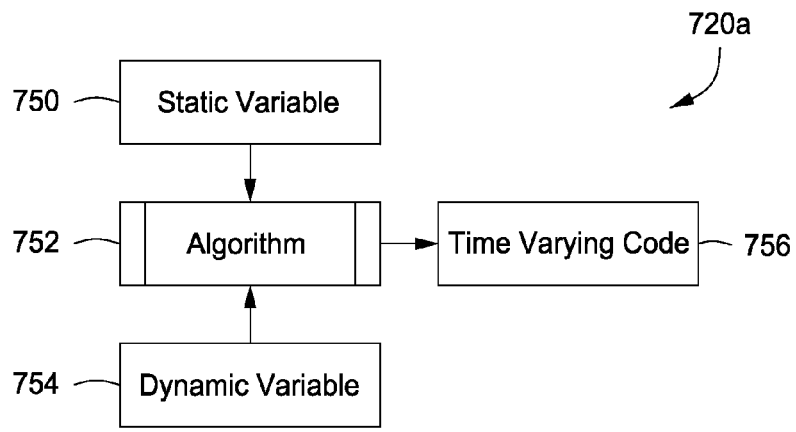
Figure 7C:
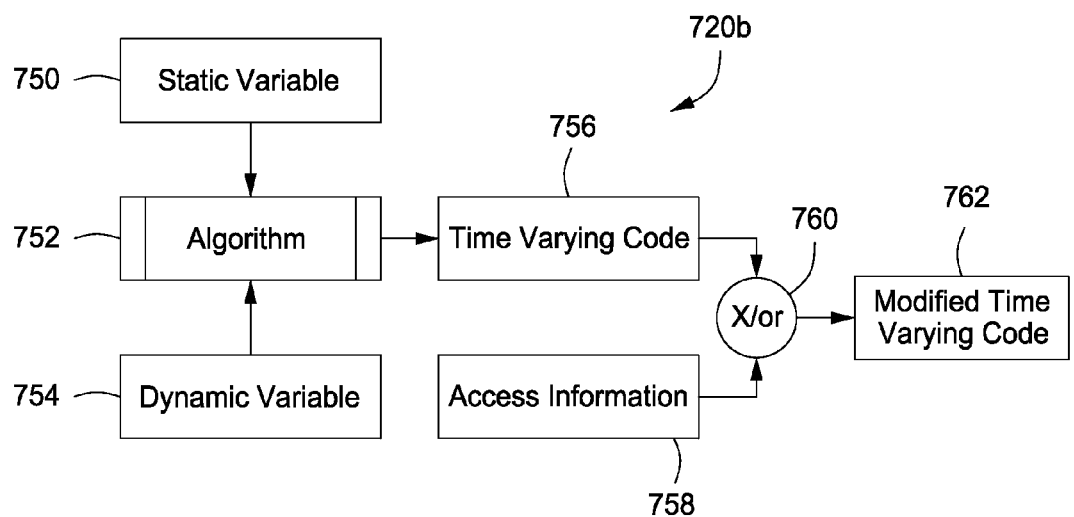

Referring now to FIGS. 7B and 7C, flow charts illustrating the generation of the time varying code are shown. As shown in FIG. 7B, the processor generates 720a the time varying code 756 using an algorithm 752, one or more static variables 750 and one or more dynamic variables 754. The static variables 750 may include the biometric information, a reproducible artifact from the biometric information, a cardholder's name, an account number, an expiration date, a issuer, a validation code, a secret code associated with the apparatus, a personal identification number, or a combination thereof. The dynamic variables 754 may include a date and time, a time interval, or a combination thereof. Likewise in FIG. 7C, the processor generates 720b the time varying code 756 using an algorithm 752, one or more static variables 750 and one or more dynamic variables 754. The static variables 750 may include the biometric information, a reproducible artifact from the biometric information, a cardholder's name, an account number, an expiration date, a issuer, a validation code, a secret code associated with the apparatus, a personal identification number, or a combination thereof. The dynamic variables 754 may include a date and time, a time interval, or a combination thereof. The time varying code 754 is then modified by X/oring it with access information 758 associated with the user to generate a modified time varying code 762. The access information 758 may include the biometric information, a reproducible artifact from the biometric information, a cardholder's name, an account number, an expiration date, a issuer, a validation code, a secret code associated with the apparatus, a personal identification number, or a combination thereof. In addition, the time varying code 756 of FIG. 7B and the modified time varying code 762 of FIG. 7C can be encrypted.

Figure 7D:
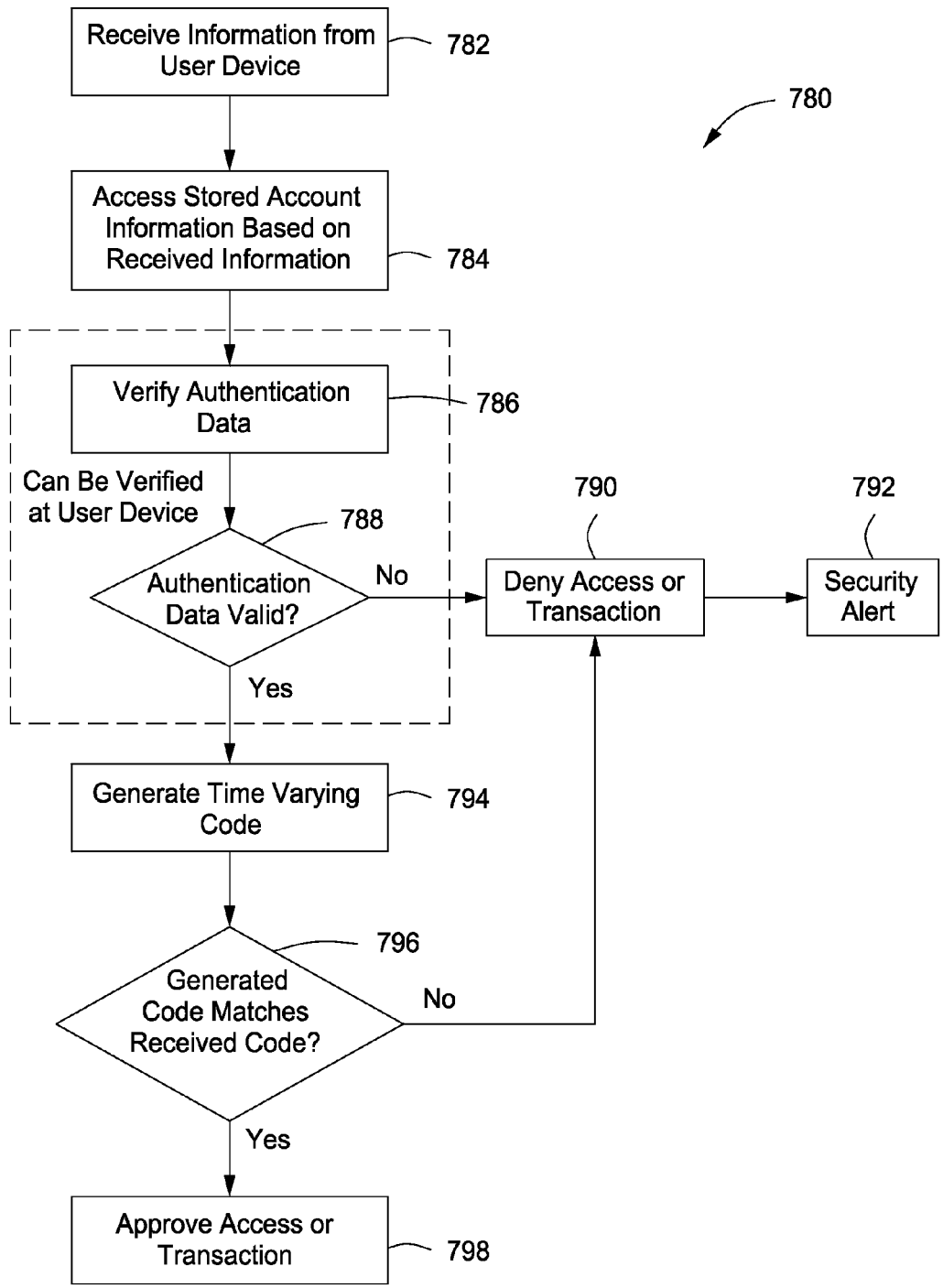

Now referring to FIG. 7D, a flow chart illustrating the processing 780 of the time varying code or modified time varying code by the system processor is shown. Information is received from the user device at the system processor in block 782. Stored account information is then accessed based on the received information in block 784. As previously described, the present invention can be configured to authenticate the user via the remote system processor as indicated by the dashed box around blocks 786 and 788, or authentication the user at the user device in which blocks 786 and 788 are eliminated. In the case of authentication by the system processor, the authentication data is verified in block 786. The verification process determines whether the authentication data is valid for one of the users by comparing the authentication data with a stored biometric template of the one or more users that are authorized or registered to use the device. If the authentication data is not valid, as determined in decision block 788, the transaction or access is denied in block 790 and a security alert is issued in block 792. If, however, the authentication data is valid, as determined in decision block 788, or in the case of authentication by the user device following accessing of the stored account information in block 784, a time varying code is generated in block 794, and the generated time varying code is compared with the received time varying code. If the two codes match, as determined in decision block 796, the transaction or access is approved (assuming the other stored account information is in order and various business rules are satisfied) in block 798. If, however, the two codes do not match, as determined in decision block 796, the transaction or access is denied in block 790 and a security alert is issued in block 792.

Additional information regarding the generation and use of time varying codes can be found in U.S. Pat. Nos. 4,720,860; 4,856,062; 4,885,778; 4,998,279; 5,023,908; 5,168,520; 5,237,614; 5,361,062; 5,367,572; 5,479,512; 5,485,519; 5,657,388; and 6,130,621 which are hereby incorporated by reference in their entirety.

Figure 8:
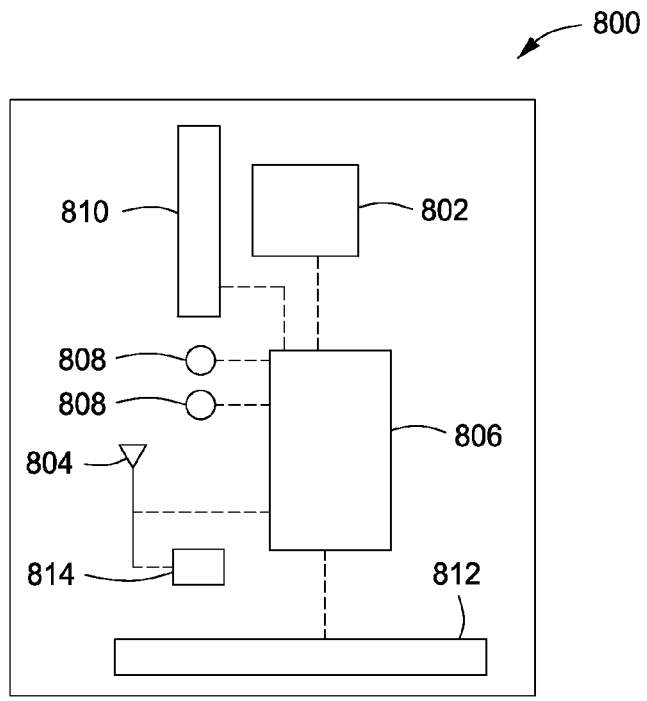
FIG. 8 depicts one embodiment of an exemplary device for effecting secure physical and commercial transactions in a contactless manner using biometrics identity validation in accordance with the present invention.

Referring now to FIG. 8, one embodiment of an exemplary device 800 for effecting secure physical and commercial transactions in a contactless manner using biometrics is shown. As will be described later in greater detail, the device 800 includes multiple components, such as a biometric sensor 802, a radio frequency ("RF") antenna 804, a controller 806, control buttons 808, a dynamic information display 810, a magnetic information media component 812, and a RF power conversion and power management unit 814. A number of inter-component communications paths 816 provide connections between various components of the device 800.

The RF antenna 804 may perform multiple functions. For example, it may capture RF energy from a RF field emanated by a RF power source and may also support two-way communication with an associated reader/writer device (not shown). The antenna 804 may be a single antenna capable of performing both functions or may comprise multiple antennae, with one antenna for capturing RF energy from the RF field and another antenna for supporting the two-way communication with the reader/writer device. The communications may include, for example, authenticated identification of a person operating the device 800, various purchases and financial transactions, air ticket booking and airport security check points, and other interactions between the device 800 and the reader/writer device. These communications may be secured using mechanisms such as data encryption. It is understood that other communications components, such as audio or optical components, may replace or supplement the antenna 804. In addition, the antenna 804 may be operable to function with wavelengths other than RF.

The biometric sensor 802 is used for sensing a physical attribute of a user of the device 800 and generating an analog of this physical attribute. The analog may then be made available to the controller 806. More specifically, the biometric sensor 802 is designed to sense some physical attribute of a person and extract a distinctive analog of that person. To be useful for establishing positive identification, the analog may need to be individualized sufficiently so as to be unique to every person. In addition, a trusted copy—a template—of the analog should be captured. Analogs later sensed by the biometric sensor 802 may then be compared against the template analog. Various physical attributes may be used for identification purposes, such as fingerprints, voice prints, and retinal or iris prints.

The controller 806 interacts with the biometric sensor 802 and other components of the device 800 to perform various functions. For example, the controller 806 may capture the analog of the physical attribute for long term storage as a trusted template analog of an authorized user, as well as for immediate comparison to a stored trusted template analog during an authentication procedure. The controller 806 may also determine whether the comparison indicates a match between the template analog and the analog captured by the biometric sensor 802. In addition, the controller 806 may control the dynamic information display 810, respond to input from the control buttons 810, and control the magnetic information media component 812. Furthermore, the controller 806 may support two-way communications with an associated reader/writer device (FIG. 9) via the RF antenna 804. The controller may be a single controller/processor or may comprise multiple controllers/processors.

The dynamic information display 810 may be used to display information to a user, as well as to enable a process with which the user may interact using the control buttons 810. The magnetic information media component 812 may be manipulated so that it provides information via a magnetic field. The RF power unit 814 may convert RF radio energy to electrical energy, and may control storage and distribution of the electrical energy to the other components in the device 800. It is understood that the device 800 may also have a battery and/or other power means to use as a backup or alternative power source for the RF power control unit 814.

Figure 9:
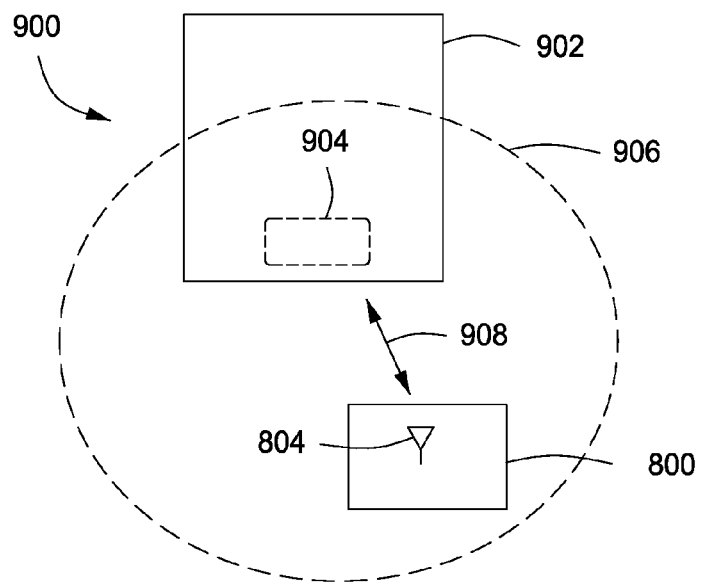
FIG. 9 depicts an exemplary environment in which the device of FIG. 8 may operate in accordance with the present invention.

Referring now to FIG. 9, the device is illustrated in an exemplary environment 900 that enables contactless interaction with a reader/writer device 902. To achieve this contactless interaction, the device 800 is shown with the antenna 804, as described in reference to FIG. 8. The device 902 uses one or more antennae 903 to communicate with device 800, as well as emanate a RF field 906 with the purpose of supplying power to compatible devices, such as device 800. In operation, a two-way communication link 908 may be established between the reader/writer device 902 and the device 800.

It is understood that many different reader/writer configurations may be used. For example, the reader/writer device 902 may be in communication with other devices or with a network. Furthermore, the reader/writer device 902 may be in communication with other devices or with a network. Furthermore, the reader/writer device 902 may include the RF power source, or they may be separate devices. For the purposes of clarity, the reader/writer device 902 of the present invention example includes the RF power source, although alternate sources of RF power may be used.

Figure 10:
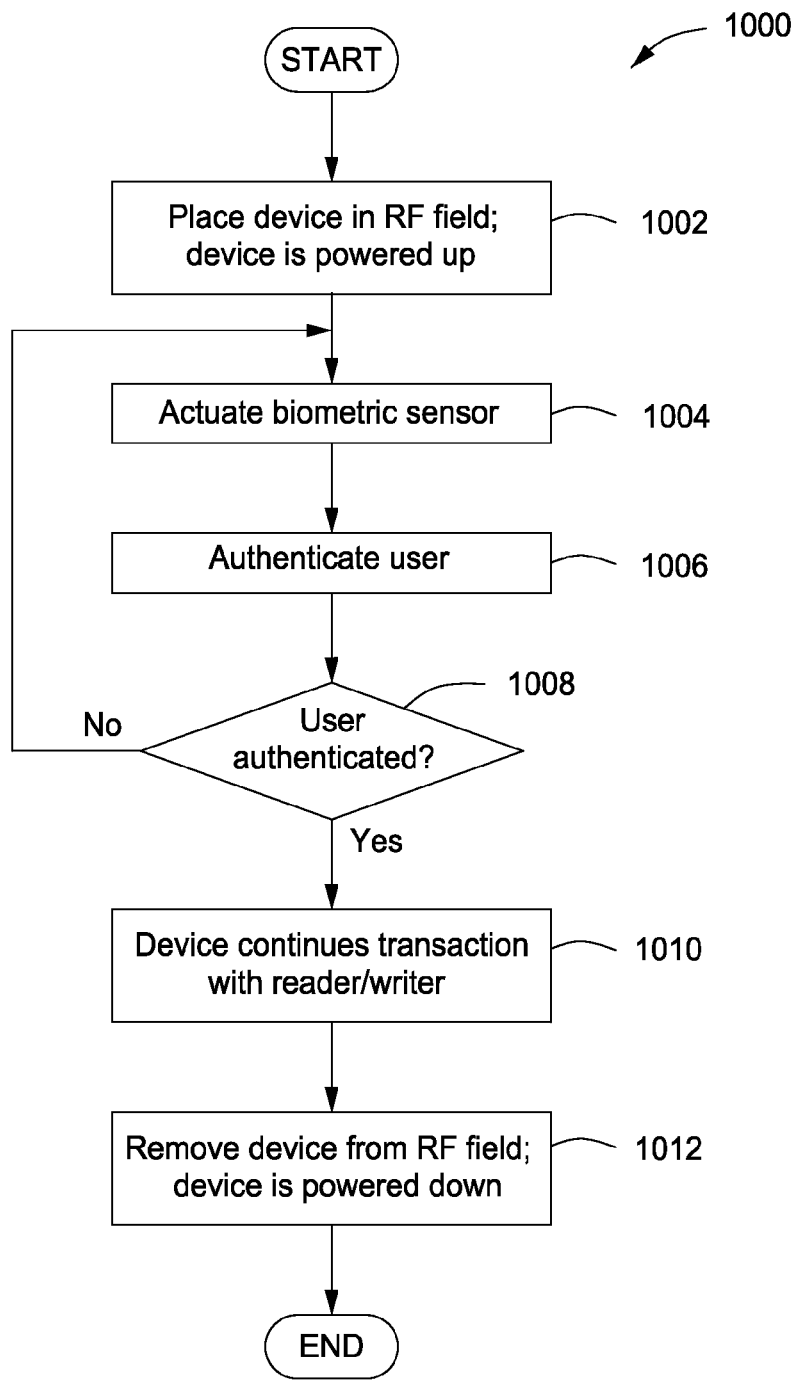
FIG. 10 is a flow chart of an exemplary method for using the device of FIG. 8 in the environment of FIG. 9 in accordance with the present invention.

Referring to FIG. 10 and with continued reference to FIGS. 8 and 9, the device 800 may be operated in the environment 900 using a method 1000 as follows. In step 1002, the device 800 is placed into the RF field 906 emanated by the reader/writer device 902. When placed into the RF field, the device 800 captures power from the RF field 906, which powers up the device's 800 electronics. In step 1004, the biometric sensor 802 is actuated by a user. The method of actuation may depend on the type of biometric sensor (e.g., a fingerprint for a fingerprint sensor, speaking for a voice sensor, etc.). In step 1006, an authentication process is performed by the device 800. As in the previous step, the authentication process may depend on the type of biometric sensor. For example, the detected fingerprint or voice may be compared to a template in the memory of the device 800. In step 1008, a determination is made as to whether the user is authenticated. If the authentication process fails to validate the user, the method 1000 may return to step 1004. If the user is validated by the authentication process, the method continues to step 1010, where the device 800 continues the desired transaction with the reader/writer device 902. Once this occurs, the device 800 may be removed from the RF field 906 in step 1012, which powers down the device 800.

Figure 11:
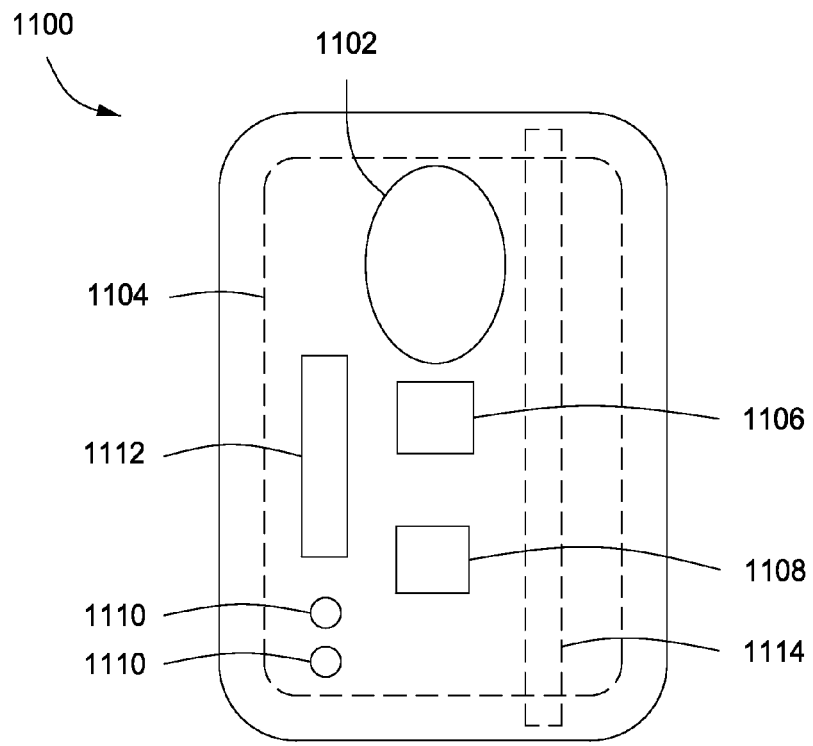
FIG. 11 is a diagram illustrating another embodiment of an exemplary device for effecting secure physical and commercial transactions in a contactless manner using biometrics identity validation in accordance with the present invention.

Referring now to FIG. 11, in another embodiment, a device 1100 illustrates an implementation of the present disclosure using a form factor similar to that of a credit card. The credit card form factor of the device 1100 includes several components, such as a fingerprint sensor 1102, a RF antenna 1104, a first controller 1106, a second controller 1108, function selector buttons 1110, an electro-luminescent display 1112 and a magnetic strip 1114. In the present example, the first controller 1106 is an application specific integrated circuit ("ASIC") chip and the second controller is a smart card chip, although it is understood that the functionality of both controllers may be provided by a single controller.

The ASIC 1106 is a custom integrated circuit chip developed for use in the device 1100. The ASIC 1106 includes Random Access Memory ("RAM") which may be used for temporarily storing a current fingerprint analog detected by the fingerprint sensor 1102 and for temporarily storing intermediate results of processing calculations (e.g., fingerprint comparisons, etc.). The ASIC 1106 may also include non-volatile memory (e.g., Flash memory or EEPROM) to store and retrieve one or more fingerprint template analogs that are used for comparison against the current fingerprint analog.

Circuitry contained within the ASIC 1106 provides an interface between the ASIC 1106 and the fingerprint sensor 1102. In the present example, the ASIC 1106 contains a microprocessor core with dedicated program and temporary memory, enabling the ASIC 1106 to use an array of processing elements for executing instructions stored with the ASIC 1106 in parallel. The instructions enable the ASIC 1106 to perform a comparison between the current fingerprint analog and a template fingerprint analog. Other instructions included within the ASIC 1106 may provide support for an authorization signal to be sent to the smart card 1108 after an authentication process has been completed. In addition, the ASIC 1106 may be used to drive the electroluminescent display 1112, read the function control buttons 1110, and drive the programmable magnetic strip 1114.

The smart card chip 1108 may support various application programs. These applications may include, for example, storage/retrieval of personal demographics information, storage/retrieval of a digitized picture of the cardholder, an "electronic purse" functionality, financial transactions, purchases, etc. In addition, the smart card chip 1108 may support two-way communication data transfers and may perform various encryption functions to support secure communications. In the present example, the communications and encryption are based on known standards, but proprietary protocols may be used if desired. It is envisioned that the smart card chip 1108 may support smart card interactions such as identification validation, credit card transactions, and others. Note that the control and processing functions of the device 1100 can be handled by the ASIC 1106, the smart card chip 1108, any combination of the ASIC 1106 and the smart card chip 1108, or a single chip.

The fingerprint sensor 1102 is designed to detect fingerprint information and provide the detected information to other components of the device 1100. In the present example, the fingerprint sensor 1102 comprises a polymer thick film ("PTF") construction, which provides the fingerprint sensor 1102 with the flexibility and ruggedness needed for implementation on the device 1100. As described in greater detail below in FIGS. 12 and 10, the fingerprint sensor 1102 comprises a matrix of points that are operable to detect high and low points corresponding to ridges and valley of a fingerprint. The points are captured and used by the ASIC 1106 to determine whether the detected fingerprint analog matches a fingerprint template analog that is stored in memory.

Figure 12:
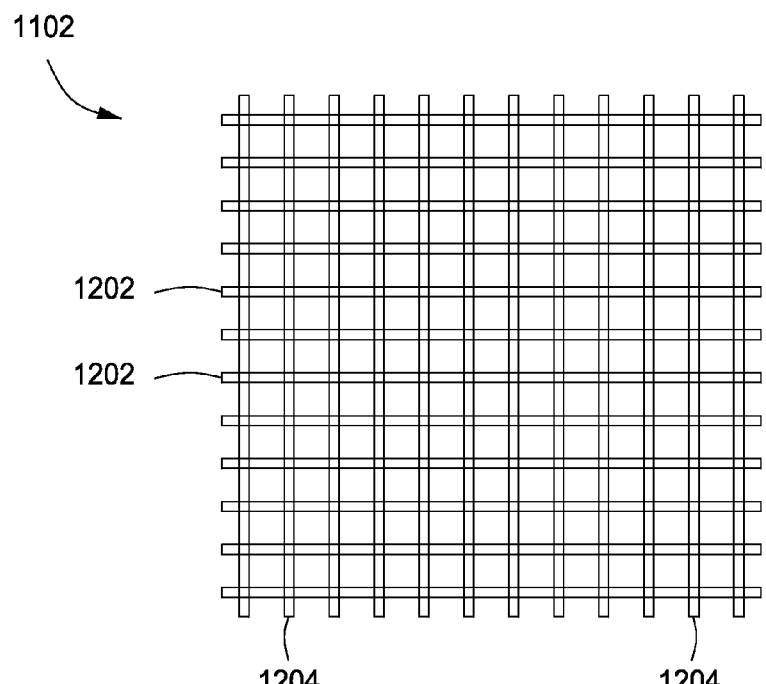
FIG. 12 is an illustration of one embodiment of a biometric sensor that may be used in the device of FIG. 11 in accordance with the present invention.

Referring now to FIG. 12, in one embodiment, the PTF sensor 1102 comprises a rectangular arrangement of row electrodes 1202 and column electrodes 1204. It is noted that more or fewer columns and rows may be included in the PTF sensor 1102, depending on such factors as the desired resolution of the PTF sensor 1102 (e.g., the number of data points desired). Electrical connections from the row and column electrodes 1202, 1204 may rout to the ASIC 1106.

In operation, a fingerprint analog detected by the PTF sensor 1102 may be captured by the ASIC 1106 as a sequence of numerical values. For purposes of illustration, the row and column electrodes 1202, 1204 may be viewed as a two dimensional matrix of pixels, with numerical values representing intersections between the row and column electrodes. The numerical values may be associated with gray scale values, and an analog representing a fingerprint may be generated from the matrix of gray scale values. It is understood that there is no need to transform the captured analog into a visible image since the matching between the stored template fingerprint analog and the candidate fingerprint analog need not rely on a visual process. However, it is convenient to conceptualize the numerical values as an image for purposes of evaluating the sensor resolution used to support fingerprint authentication. It is generally accepted that a graphical resolution of from 100 dots per inch ("dpi") to 500 dpi is sufficient for fingerprint authentication. In the present example, the PTF sensor 1102 comprises 200 row electrodes and 200 column electrodes arranged in a ½" by ½" matrix, which corresponds to a graphical resolution of 400 dpi.

Figure 13A:
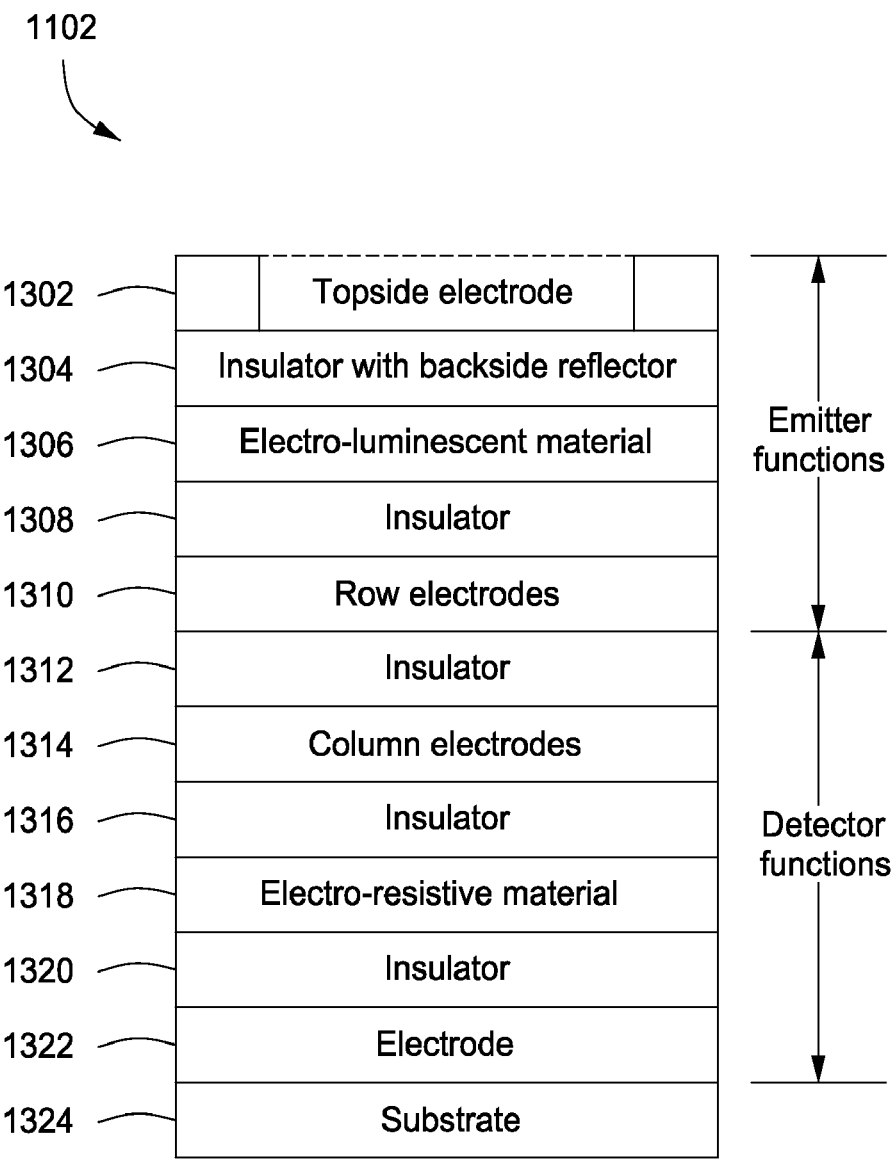
FIG. 13A illustrates various layers that form one embodiment of the biometric sensor of FIG. 12 in accordance with the present invention.

Referring now to FIG. 13A, a schematic depiction of functional layers of one embodiment of the PTF sensor 1102 of FIG. 11 is shown. The PTF sensor 1102 is comprised of functional layers including an annularly shaped topside electrode 1302; an insulator with backside reflector 1304; and electro-luminescent layer 1306; insulator layers 1308, 1312, 1316, and 1320; row electrodes 1310; column electrodes 1314; an electro-resistive layer 1318; and electrode 1322; and a substrate layer 1324. The substrate layer 1324 may be a portion of the substrate for the entire device 1100.

In operation, when a user of the device 1100 places a finger or thumb (henceforth only finger will be specified, although it is understood that both fingers and thumb are intended) on the surface of the PTF sensor 1102, the finger contacts the topside electrode 1302 and becomes electrically grounded to the topside electrode 1302. When a voltage is applied to row electrodes 1310, and electric field is generated between the row electrodes 1310 and the topside electrode 1302. The strength of the generated field varies depending on how close the finger is to the topside electrode 1302. For example, fingerprint ridges may be relatively close to the topside electrode 1302 of the PTF sensor 1102, varying the generated field in a detectable manner. Fingerprint valleys may be more distant form the PTF sensor 1102 than the fingerprint ridges, which may vary the generated field in a detectable manner that may be differentiated from the variations caused by the fingerprint ridges.

The electro-luminescent layer 1306 may emit more or less light as the electric field that impinges upon it varies, thereby generating an analog of the fingerprint incident upon the PTF sensor 1102. The reflector component of the insulator with backside reflector layer 1304 serves to reflect the omni directional light emitted by the electro-luminescent layer 1306 and thus intensify the fingerprint analog. The PTF sensor 1102 may be operated by applying a bias voltage to only one row electrode at a time, successively biasing and unbiasing one row after another. This has the effect of causing the electro-luminescent layer 1306 to generate an analog of an elongated thin strip of the fingerprint. By sensing each of these analogs and combining them upon completion of row sequencing, a complete analog may be collected.

It is a property of the electro-resistive layer 1318 that when it is placed in an electrical field its resistance varies with the intensity of light incident upon it. The light emitted by the electro-luminescent layer 1306, which is an analog of the fingerprint, passes through the intervening layers 1308, 1310, 1312, 1314, and 1316 to impinge upon the electro-resistive layer 1318. The electro-resistive layer 1318 is placed in an electric field by placing a DC voltage bias on the electrode 1322 relative to the column electrodes 1314, causing the electro-resistive layer to exhibit varying resistance depending upon the intensity of light incident upon it and thereby forming an analog of the fingerprint. A voltage is applied to the column electrodes 1314, and the impedance between the column electrodes 1314 and the electrode 1322 can be measured. This measured impedance is directly related to the varying resistance of the lector-resistive layer 1318 and hence an analog of the fingerprint. So by activating each row electrode in succession, as described above, an analog of the fingerprint can be captured and stored.

The ASIC 1106 may control the sequential activation of the row electrodes 1310, the reading back of the varying resistance from the column electrodes 1314, and other functions of the PTF sensor 1102. It is understood that other approaches may be used, such as reading one column at a time for each row or reading multiple row/columns at once. Furthermore, while the preceding description focuses on the use of the PTF sensor 1102 as a fingerprint sensor, the principle of operation of the PTF senor 1102 is general and not limited to capturing fingerprint analogs.

Figure 13B:
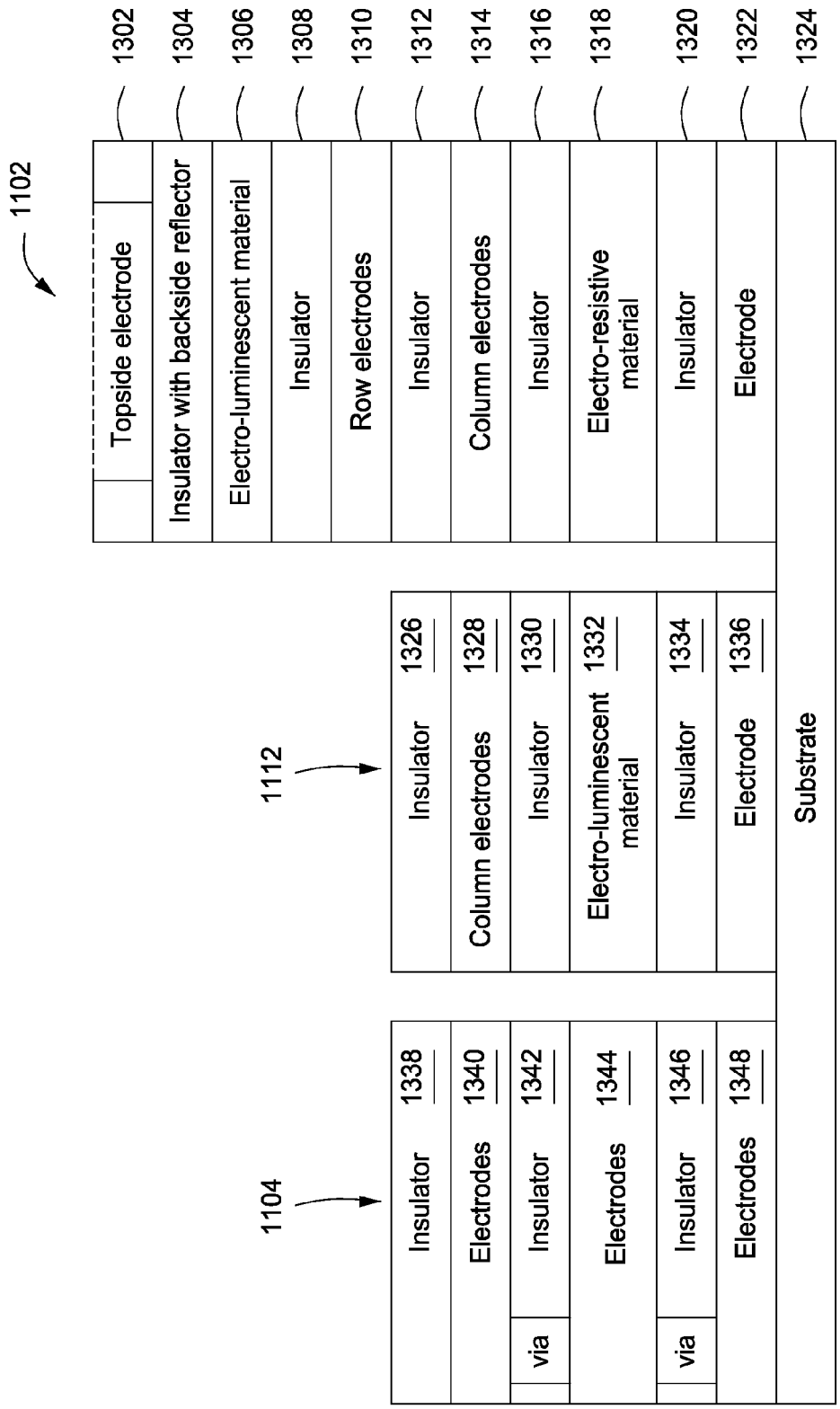
FIG. 13B illustrates various layers that form a portion of one embodiment of the device of FIG. 11 in accordance with the present invention.

Referring now to FIG. 13B, one embodiment of a portion of the device 1100 illustrates the biometric sensor 1102, display 1112, and RF antenna 1104 formed on the substrate 1324. The biometric sensor includes layers 1302-1322 as described with respect to FIG. 10, the display 1112 comprises layer 1326-1336, and the RF antenna comprises layers 1338-1348. As is illustrated in FIG. 13B, each of the components 1102, 1112, 1104 share a number of layers (e.g., 1322, 1336, and 1348). This sharing simplifies the design of the device 1100 and may also reduce manufacturing costs.

Referring again to FIG. 11, the RF antenna 1104, which may include one or more antennae, may capture RF energy from a RF field emanated by a RF power source and may also support two-way communication with an associated reader/writer device (not shown). The RF energy which is captured is converted to electrical energy and accumulated within the device 1100. In some embodiments of the device 1100, a rechargeable battery may power the electronic components when no RF energy field is present. Such a battery may be charged via a RF energy field or alternative charging means.

The electro-luminescent display 1112 provides the capability to display information to a user of the device 1100. For example, the information may include a credit card number to support "card not present" transactions, a residual balance of an "electronic purse," air travel flight and seat assignment information, and similar information. Furthermore, interaction with the display 1112 may be accomplished via the function control buttons 1110. For example, the buttons 1110 may be used to select a credit card number (if the device 1100 stores multiple numbers) viewed via the display 1112 or to enter a personal identification number. The pliability of the electro-luminescent display 1112 aids its use in the card-like form factor of the device 1100. While two control buttons 1110 are illustrated, it is understood that other numbers and configurations of function control buttons may be used.

A dynamic magnetic strip 1114 is provided to provide compatibility with existing reader devices. The dynamic magnetic strip 1114 may be used in either fixed or dynamic mode. In dynamic mode, magnetically stored information—such as a credit card number—may be changed under control of the ASIC 1106.

Figure 14:
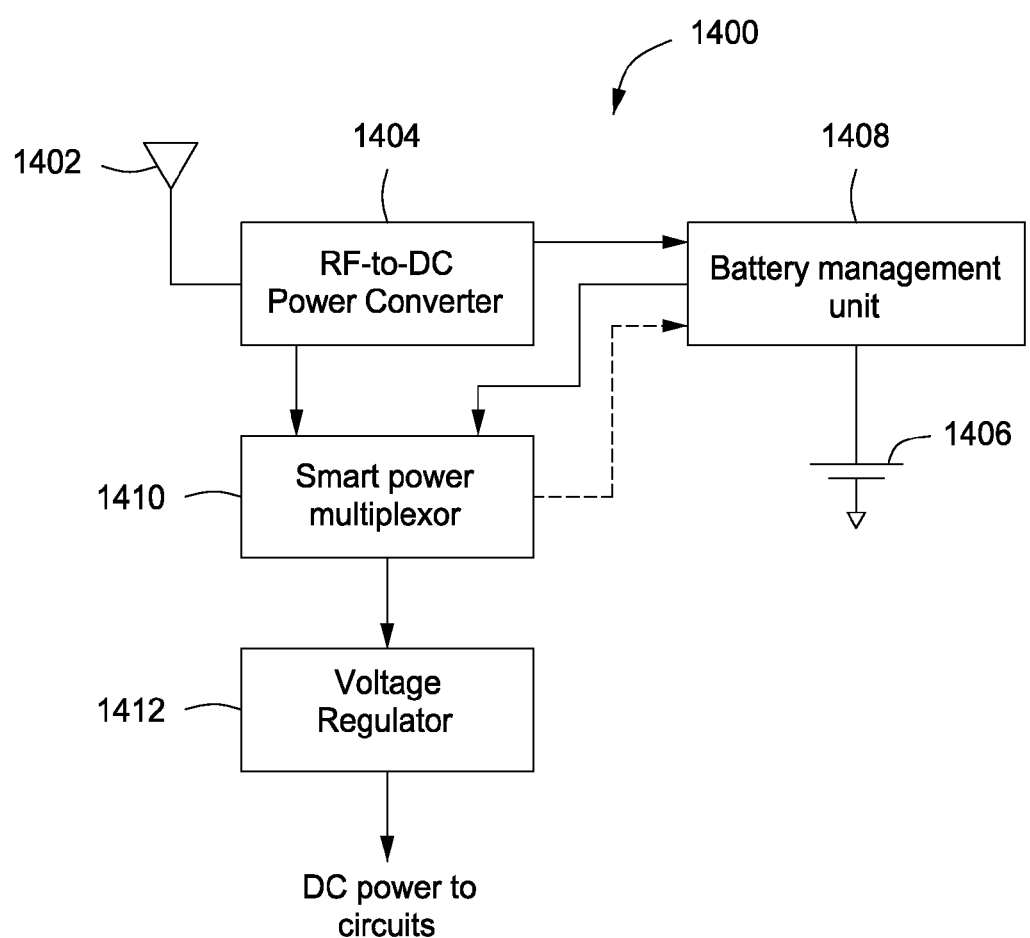
FIG. 14 is a diagram of an exemplary power circuit that may be used in the device of FIG. 11 in accordance with the present invention.

Referring now to FIG. 14, an illustrative power circuit 1400, such as may be used in the device 1100 of FIG. 11, is depicted. When appropriate RF energy is incident upon the device 1100, the RF energy couples into a RF antenna 1402. From the antenna 1402, the energy enters a RF-to-DC power converter 1404, which includes a full-wave rectifier to convert the AC RF field into a DC-like circuit. Capacitance may be provided to buffer the AC peak variations into a DC-like source. The intermediate power generated by this process may be used for a variety of purposes, such as charging a battery 1406 if the battery 1406 is below its full capacity and feeding power to the device 1100. The battery 1406 may be charged through a battery management unit 1408. A smart power multiplexer 1410 may be used to determine whether to draw power from the battery management unit 1408, directly from the RF-to-DC power converter 1404, or from both.

A voltage regulator 1412 creates a stable DC voltage level to power the device 1100. When no RF energy is coupled into the RF antenna 1402, the RF-to-DC converter 1404 may not function and power may be drawn from the battery management unit 1408 by the smart power multiplexer 1410. As before, the voltage regulator 1112 creates a stable DC voltage level to power the device 1100. It is understood that, in other embodiments, the power circuit 1400 may not employ a battery or rechargeable battery, and may relay solely on power captured from the RF field.

Figure 15:
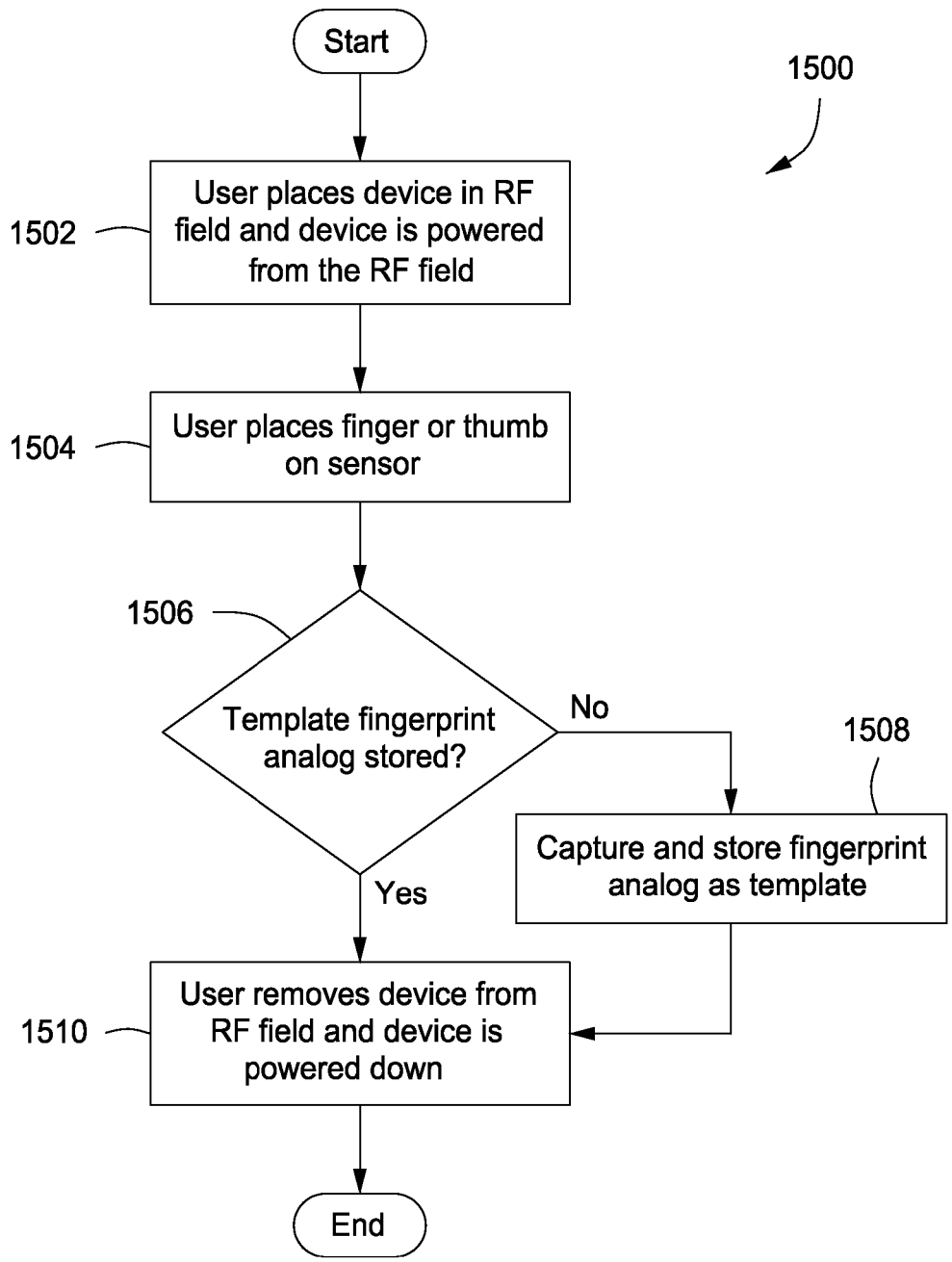
FIG. 15 is a flow chart of an exemplary method for storing a template fingerprint analog in the device of FIG. 11 in accordance with the present invention.

Referring now to FIG. 15, an exemplary template storage method 1500 illustrates one embodiment for capturing and storing a template of a fingerprint analog for the device 1100 of FIG. 11. In step 1502, a user places the device 1100 in a RF field emanated by a reader/writer device. As described previously, the device 1100 captures power from the RF field. In step 1504, the user places his thumb or finger on the finger print sensor 1102 and, in step 1506, the device 1100 determines whether a template fingerprint analog is already stored. If it is determined that no template fingerprint analog is stored, the method 1500 continues to step 1508. In step 1508, the user's incident fingerprint is sensed by the fingerprint sensor 1102, a fingerprint analog is generated by the fingerprint sensor 1102, and the ASIC 1106 stores the fingerprint analog as a template fingerprint analog. If a fingerprint template analog is already stored, the method 1500 continues to step 1510, where the device 1100 is removed from the RF field. It is understood that other events may occur before step 1510 if a fingerprint template analog is already stored, such are illustrated in FIG. 16.

Although not shown in the present example, multiple template fingerprint analogs may be stored in the device 1100. The template fingerprint analogs may represent multiple fingerprints of a single person or may represent the fingerprints of different people. This may be accomplished, for example, by implementing a method for allowing the device 1100's owner to securely control initialization of multiple template fingerprint analogs and to selectively engage which template fingerprint analog will be used to authenticate identity and authorize transactions. Alternately, if the device 1100 is to be used in environments requiring higher security, the user of the device 1100 may need to appear in person and validate his or her identify using traditional methods (e.g., a driver's license, birth certificate, etc.). After validation, the user's template fingerprint analog may be place into the device 1000 as described above or through other means (e.g., a scanner that transfers the template fingerprint analog into the device 1000).

Figure 16:
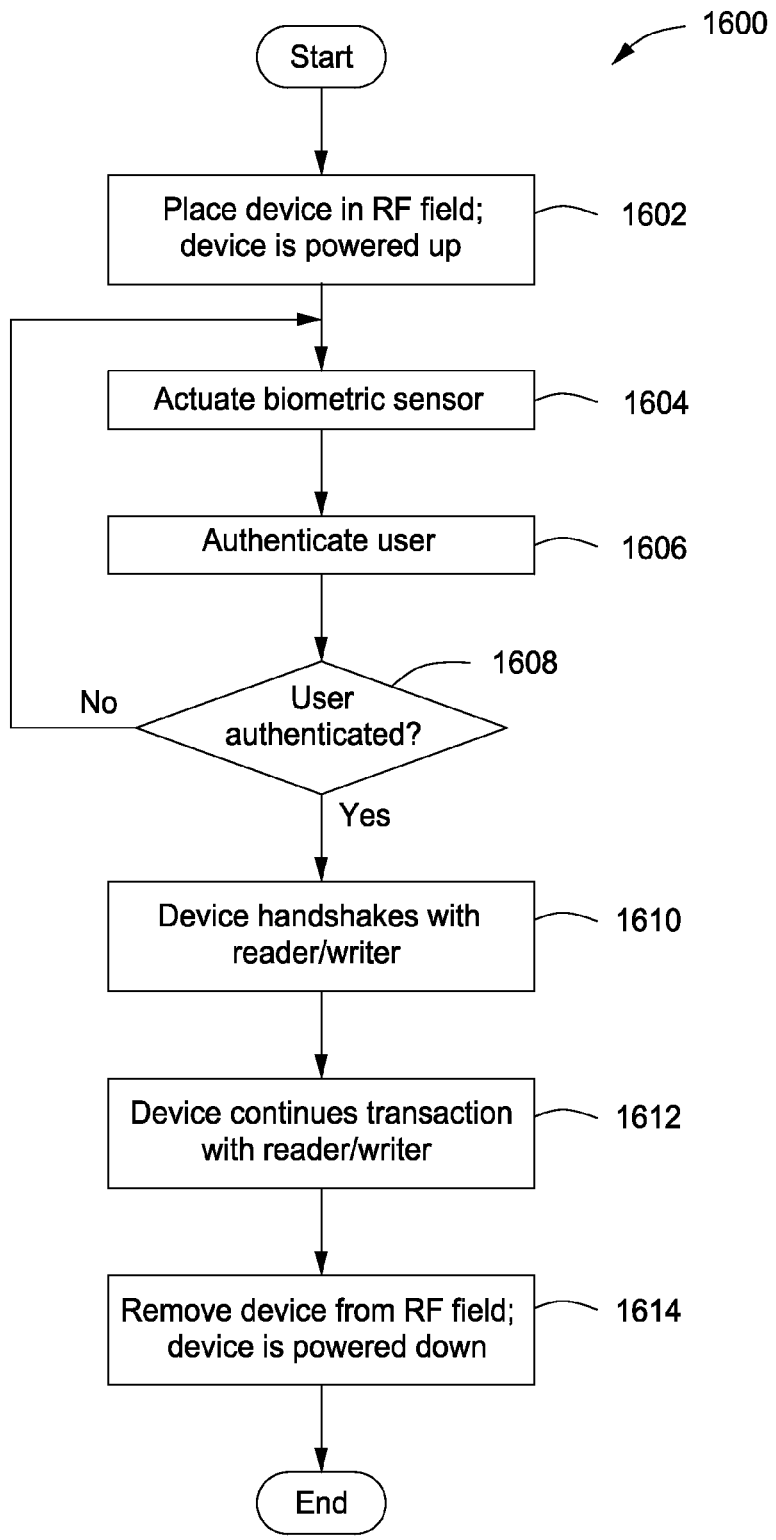
FIG. 16 is a flow chart of an exemplary method for using the device of FIG. 11 in accordance with the present invention.

Referring now to FIG. 16, in another embodiment, a method 1600 illustrates one method of operation for the device 1100. In step 1602, as has been described previously, the device 1100 is placed into a RF field emanated by a reader/writer device. When placed into the RF field, the device 1100 captures power, energizing its electronics. In step 1604, a user places one of his fingers onto the fingerprint sensor 1102. As described above, the fingerprint sensor 1102 captures an analog of the fingerprint and passes the analog to the SAIC 1106.

In step 1606, an authentication process is performed by comparing the captured fingerprint analog to one or more template fingerprint analogs stored in memory. In step 1608, a determination is made as to whether the user is authentication (e.g., whether the captured fingerprint analog matches a stored template fingerprint analog). If the authentication process fails to validate the user, the method 1600 may return to step 1604 as shown or may end, requiring the user to remove the device 1100 from the RF field and begin again with step 1602. If the user is validated by the authentication process, the method continues to step 1610, where the device 1100 conducts a communications handshake process with the reader/writer device via a contactless two-way communication link. In step 1612, the device 1100 continues the desired transaction with the reader/writer device. Once this occurs, the device 1100 may be removed from the RF field, which powers down the device 1100.

Figure 17:
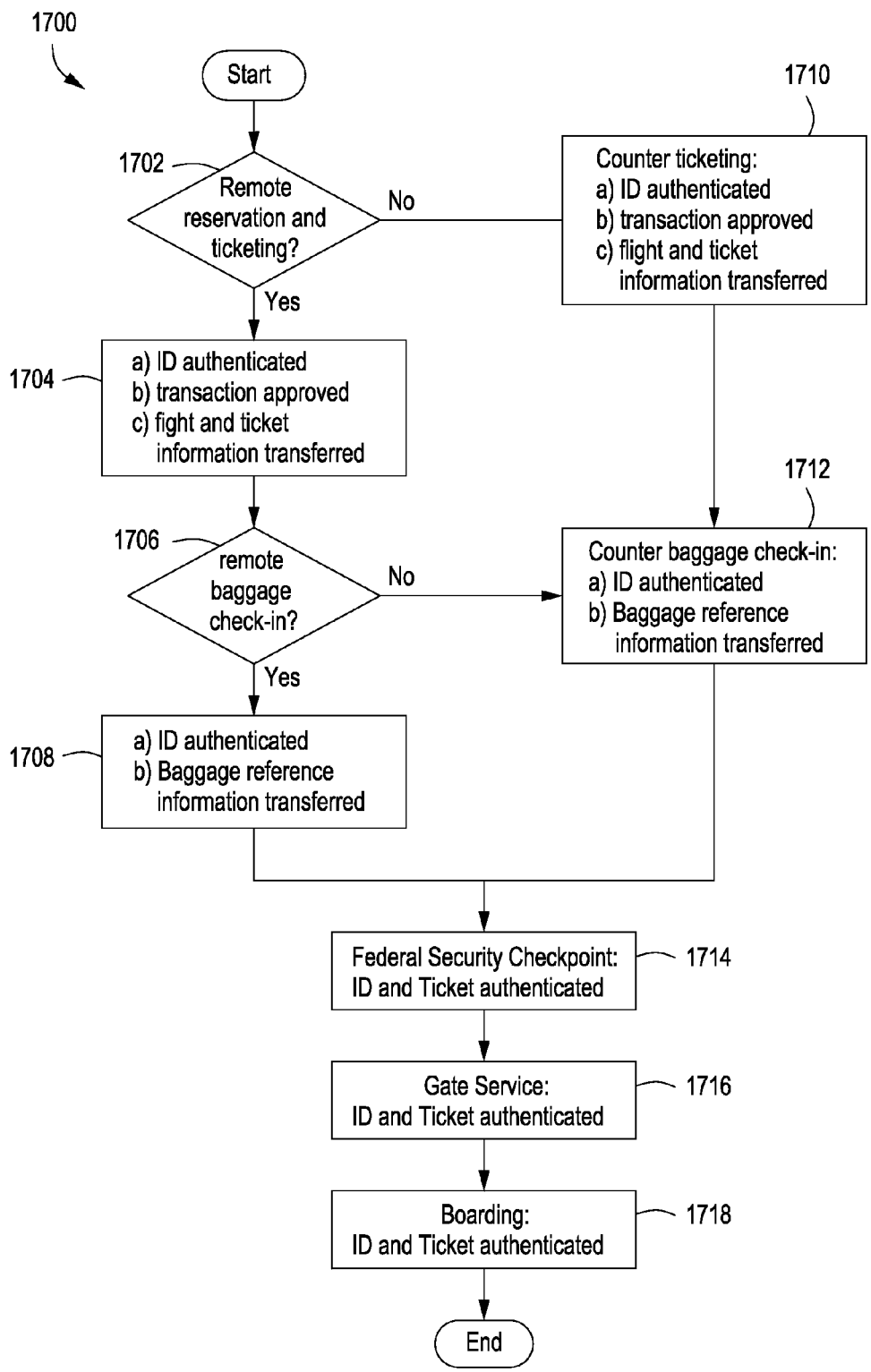
FIG. 17 is a flow chart of an exemplary method for using the device of FIG. 1 in an air transportation environment in accordance with the present invention.

Referring now to FIG. 17, in another embodiment, a method 1700 illustrates using the present disclosure in an air transportation environment. A traveler desiring to make a remote reservation presents a device (such as the device 800 of FIG. 8) to a reader/writer device. In the present example, the reader/writer device is attached to a personal computer ("PC") via a wired or wireless connection. The PC may enable the traveler to access an application, such as a web based flight reservation application.

In step 1702, a determination is made as to whether the traveler has selected a remote reservation and ticketing process. If the traveler has selected such a process, the method 1700 continues to step 1704, where the device 800 is used in conjunction with PC and the reader/writer to verify the traveler's identification and approve the transaction and associated payments. In addition, flight information may be transferred from the reader/writer device into the device 800.

The method 1700 then continues to step 1706, where a determination is made as to whether the traveler has selected to remotely check-in baggage. If the traveler has not selected to remotely check-in baggage, the method 1700 continues to step 1712. If the traveler has selected to remotely check-in baggage, the method 1700 continues to step 1708, where the device 800 is used in conjunction with PC and the reader/writer to verify the traveler's identification. In addition, flight and ticket information may be read from the device 800 to further automate the baggage check-in process. After the traveler has entered any desired information (e.g., number of bags, etc.), baggage reference information may be transferred into the traveler's device 800 for later transfer into and use by the airline's ticketing and baggage tracking systems.

Returning to step 1702, if it is determined that the traveler has not selected a remote reservation and ticketing process, the method 1700 continues to step 1710, where the traveler may use the device 800 with a reader/writer device at a counter or self-service kiosk in a manner similar to the process of the remote check-in of step 1704. More specifically, the traveler may use the device 800 to verify the traveler's identification and approve a purchase transaction, as well as any associated payments. In addition, flight information may be transferred from the reader/writer device into the device 800.

Continuing to step 1712, the traveler may use the device 800 with the reader/writer device at the counter or self-service kiosk in a manner similar to the process of the remote baggage check-in of step 1708. More specifically, the traveler may use the device 800 to verify the traveler's identification, provide flight and ticket information, and store baggage reference information that is transferred from the reader/writer device.

After the ticketing and baggage check-in, the method 1700 continues to steps 1714, 1716, and 1718, where the traveler may present the device 800 to other reader/writer devices for identification and ticket authentication. For example, this may occur at security checkpoints, gates, and/or at boarding. It is understood that some of the reader/writer devices may be in communication with airline and/or government databases.

Figure 18:
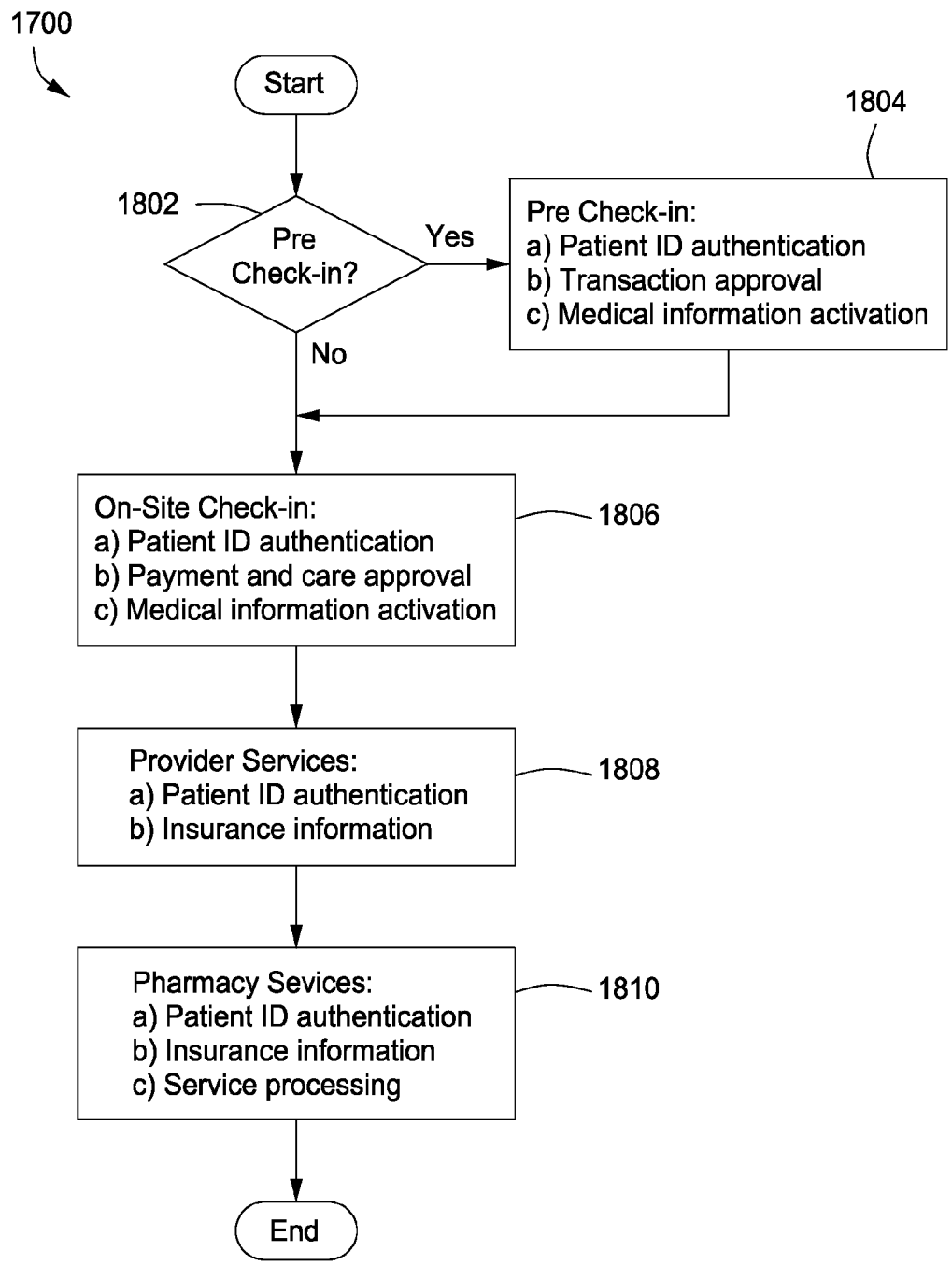
FIG. 18 is a flow chart of an exemplary method for using the device of FIG. 1 in a healthcare environment in accordance with the present invention.

Referring now to FIG. 18, in another embodiment, a method 1800 illustrates using the present disclosure in a health care environment. In step 1802, a determination is made as to whether a patient desires to perform a pre check-in process before arriving at a healthcare facility. If it is determined that the patient does desire to perform a pre check-in process, the method 1800 continues to step 1804, where the patient may present a device (such as the device 800 of FIG. 8) to a reader/writer device. In the present example, the reader/writer device is attached to a personal computer via a wired or wireless connection. The PC may enable the patient to access an application, such as a wed-based healthcare application. Upon presentation of the device in step 1804, the patient may be identified, payment and care instructions may be approved, and medical information (e.g., records, prescriptions, etc.) may be activated. The device 800 may also be used to provide the patient with medical alerts.

In step 1806, if the patient has not performed the pre check-in process of step 1804, the patient may use the device 800 to perform similar functions at the healthcare facility. The method then continues to step 1808, where the device may be used to access provider services. For example, the device 800 may be used to interact with a reader/writer device at a desk or workstation in the healthcare facility (e.g., an examination room). This interaction may authenticate the patient's identification, provide access to pertinent medical records, verify that the records are updated, and store one or more prescriptions.

Continuing to step 1810, the patient may present the device 800 to a reader/writer device at a pharmacy. The device 800 may be used to authenticate the patient's identification for a prescription and provide the prescription to the pharmacy. Furthermore, the device 800 may provide insurance/payment information and enable the patient to approve the transaction.

Figure 19:
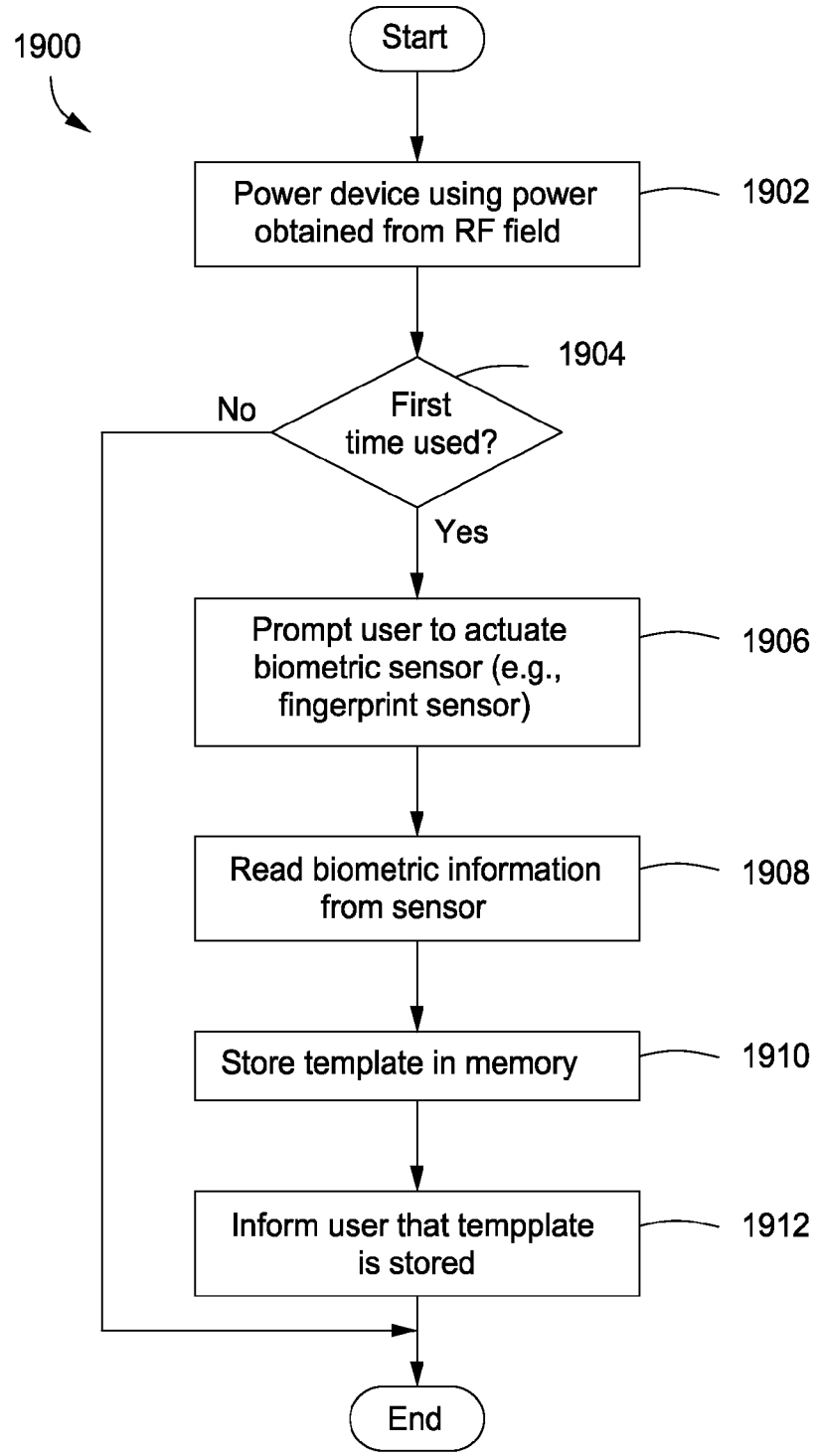
FIG. 19 is flow chart of an exemplary method for storing a biometric template analog in the device of FIG. 8 in accordance with the present invention.
Figure 20:
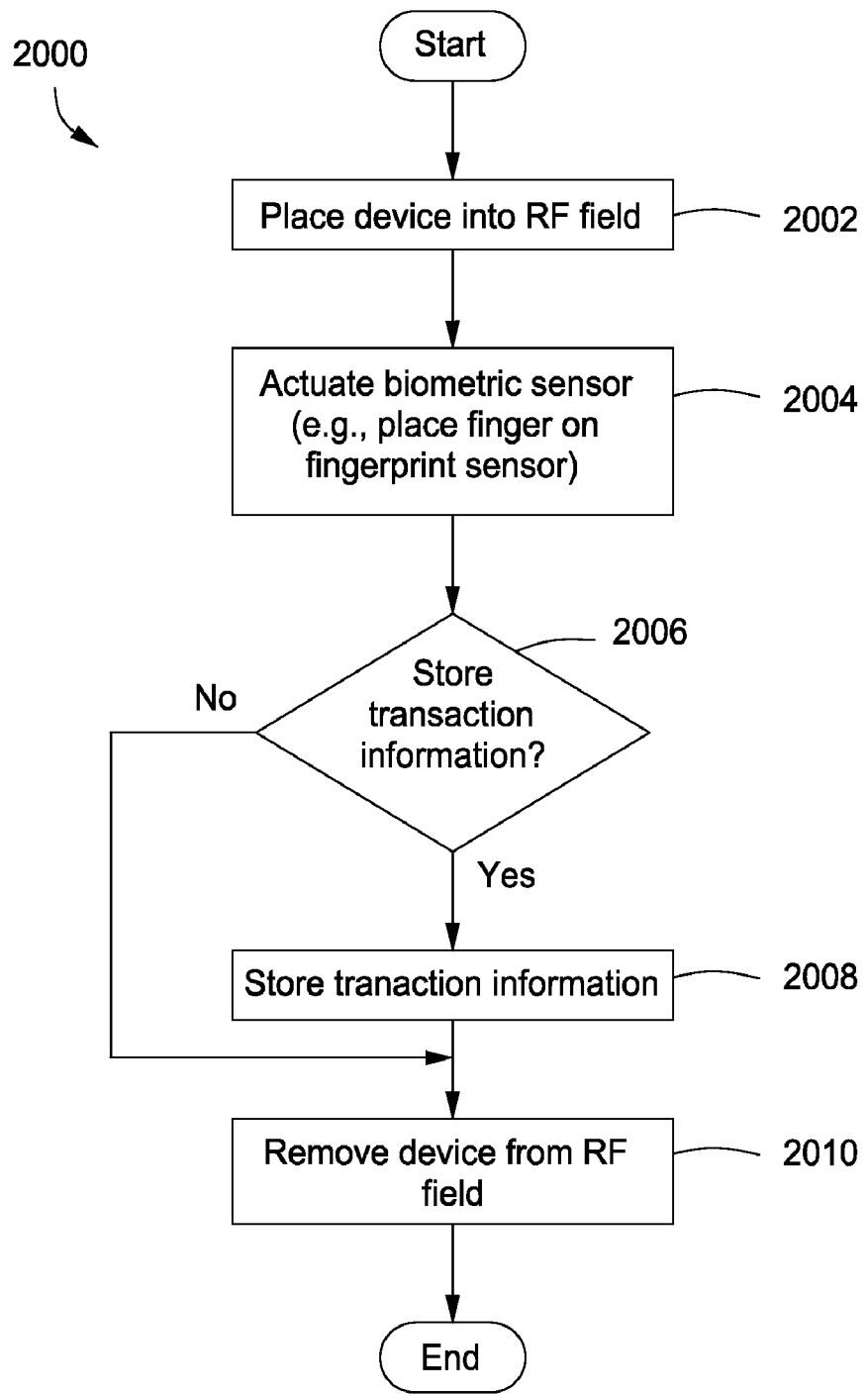
FIG. 20 is a flow chart of an exemplary method for using the device of FIG. 8 in a financial transaction in accordance with the present invention.

Referring now to FIGS. 19 and 20, in another embodiment, methods 1900 and 2000 illustrate using the present disclosure in a financial transaction environment. The financial transaction environment includes making retail purchases in either a physical store or on-line (e.g., over the Internet). The present disclosure may be implemented in the financial transaction environment by using a device, such as the device 800 of FIG. 8, to identify buyers, verify the identity of the buyer rapidly in a localized venue, associate the buyer's identity with a credit or debit account, and/or assure the availability and legitimacy of funds in these accounts for payment transactions.

Payments for retail purchases are generally accomplished in one of three ways: with cash; with a check; or with a credit or debit card. In a cash transaction, there is generally no need for validating the identification of the buyer. In a transaction where a check is used, there generally is a need for identification of the buyer. This identification may occur by way of the buyer's presentation of a driver's license or alternate, approved identification card, presentation of a credit card to indicate credit-worthiness, or by a telecommunication connection to check security processing service to assure fund availability for, and legitimacy of, the check presented for payment.

In a transaction where a credit or debit card is used, there are generally various procedural mechanisms in place to assure buyer identification and legitimate ownership of the card presented for the payment transaction. For example, the payment may require the entry of numeric PIN ("Personal Identification Number") security code by the buyer and assumed owner of the card. Alternatively, sales personnel may compare the buyer's signature on the back of the card presented for payment versus the requested signature on the purchase receipt provided for the goods or services purchased. In some cases, cards have a photograph of the card owner on them, and sales personnel may make cursory comparisons of this photograph with the buyer to establish identification. However, both photographic comparison and PIN-based card authorization have weaknesses for assuring identification, and both have potential risk for fraudulent processing. Photographs can be falsified and PIN numbers can be stolen. In the case of on-line purchases, buyers are not present to provide authorizing signatures, photographic comparisons cannot be made with existing processing infrastructure, and PIN-based transactions can be compromised with identity theft.

Referring specifically to FIG. 19, before the device 800 is usable in financial transactions, it should be initialized by the buyer/owner with the registration of a selected fingerprint pattern into secured memory of the device 800. To register a selected fingerprint, the device owner holds the device 800 in the RF field generated by a point of sale ("POS") device, which may be a kiosk, personal computer, cash register, or similar device. The RF energy from the POS device provides for the power of the device 800 and display activation in step 1902. In step 1904, a determination is made as to whether the device 800 has been previously used. For example, the device 800 may determine if a fingerprint template analog is already stored in memory. If the device 800 has been previously used, the method 1900 ends. If the device has not been previously used, the device 800 continues to step 1906, where the owner is prompted to actuate the biometric sensor. For example, this may entail the owner briefly touching the biometric sensor 802 on the device 800 with a selected finger or thumb. The fingerprint information is read from the biometric sensor 802 and stored in the device 800 in steps 1908, 1910 while the owner maintains contact with the biometric sensor 802. The owner may maintain contact with the biometric sensor 802 until, in step 1912, an acknowledgement is displayed on the display 800 that the fingerprint pattern has been successfully registered in the device 800 as an encrypted template.

Referring specifically to FIG. 20, to authorize a payment transaction where invoice information is displayed by the POS device, the user of the device 800 holds the device 800 within a RF field generated by a RF reader connected to the POS device in step 2002. For example, the user may hold the device 810 at an approximate six inch distance from the RF reader. In step 2004, the user actuates the biometric sensor 802 (e.g., touches the fingerprint sensor with his/her finger or thumb) to effect a comparative match with his/her previously registered fingerprint securely stored in the memory of the card. A successful match effects an encrypted approval and transfer of cardholder account data to the seller's administrative account receivables processing system.

In step 2006, a determination is made as to whether the user desires to transfer electronic receipt information to the device 800. If not, the method 2000 continues to step 2010, where the device 800 is removed from the RF field. If it is determined in step 2006 that the user does want to transfer electronic receipt information to the device 800, the method 2000 continues to step 2008, where the device 800 stores the information in memory. The method 2000 may then continue to step 2008, where the device 800 is removed from the RF field.

While the preceding description shows and describes one or more embodiments, it will be understood by those skilled in the art that various changes in form and entail may be made therein without departing from the spirit and scope of the present disclosure. For example, the present disclosure may be implemented in a variety of form factors, such as a wristwatch or wristwatch band, a key ring, or a variety of other physical structures. Therefore, the claims should be interpreted in a broad manner, consistent with the present disclosure.

What is claimed is:

1. An apparatus comprising:
a substrate;
a magnetic field generator disposed within the substrate, wherein the magnetic field generator is normally inactive and comprises a magnetic stripe either mounted on the substrate or disposed within the substrate, one or more induction coils disposed within the substrate underneath a length of the magnetic stripe and a control circuit disposed within the substrate that is connected to the one or more induction coils, and generates a time-varying magnetic signal containing information stored in the apparatus and a time varying code by pulsing the one or more induction coils underneath the magnetic stripe when activated by a processor, wherein the time-varying magnetic signal is transmitted to a magnetic stripe reader and emulates a data stream generated by swiping a static magnetic stripe card through the magnetic stripe reader but is not created by swiping the magnetic stripe of the apparatus through the magnetic stripe reader or using an adapter to interface with the magnetic stripe reader;
an initiator mounted on the substrate;
a memory disposed within the substrate;
the processor disposed within the substrate and communicably coupled to the magnetic field generator, the initiator and the memory, wherein the processor processes information received from the initiator, and whenever the user is successfully verified based on the received information: (a) accesses the information stored in the apparatus, (b) generates the time varying code using an algorithm, one or more static variables and one or more time-based dynamic variables, and (c) activates the magnetic field generator to transmit the information stored in the apparatus and the time varying code; and
a power source disposed within the substrate and electrically connected to the magnetic field generator, the initiator and the processor.

2. The apparatus as recited in claim 1, wherein:
the initiator comprises a biometric sensor that provides biometric information, a user interface that provides user information and/or one or more commands, or a combination thereof;
the biometric sensor is selected from the group consisting of a fingerprint sensor, retina sensor, iris sensor, signature, DNA sensor or voice sensor; and
the user interface is selected from the group consisting of a touch pad, one or more buttons, a display and a voice sensor.

3. The apparatus as recited in claim 2, wherein the processor uses the biometric information to verify that a user is authorized to use the apparatus and activates the magnetic field generator when the user is verified.

4. The apparatus as recited in claim 2, wherein the biometric information is transmitted to a system processor via the magnetic field generator where the system processor uses the biometric information to verify that a user is authorized to use the apparatus.

5. The apparatus as recited in claim 2, wherein the processor deactivates the magnetic field generator after the magnetic field generator has been active for a specified period of time, when the biometric sensor no longer detects the authorized user or both.

6. The apparatus as recited in claim 1, wherein:
the one or more static variables comprise a biometric information, a reproducible artifact from the biometric information, a cardholder's name, an account number, an expiration date, a issuer, a validation code, a secret code associated with the apparatus, a personal identification number, or a combination thereof; and
the one or more time-based dynamic variables comprise a date and time, a time interval, or a combination thereof.

7. The apparatus as recited in claim 6, wherein the time varying code is encrypted, modified by access information associated with the user or a combination thereof.

8. The apparatus as recited in claim 7, wherein the access information associated with the user comprises the biometric information, a reproducible artifact from the biometric information, a cardholder's name, an account number, an expiration date, a issuer, a validation code, a secret code associated with the apparatus, a personal identification number, or a combination thereof 9. The apparatus as recited in claim 1, wherein the power source is selected from the group consisting of a battery, a piezoelectric generator, a solar panel, an electromagnetic energy converter, a kinetic energy converter and combinations thereof.

10. The apparatus as recited in claim 1, wherein the power source comprises:
a battery;
a power generator;
a converter electrically connected to the power generator and operable to convert power received from the power generator into power usable by the apparatus or to charge the battery;
a battery management unit connected to the battery; and
a power multiplexer connected to the battery management unit and the converter and operable to determine whether to draw power from the battery management unit, from the converter, or from both.

11. The apparatus as recited in claim 1, further comprising an output interface mounted on the substrate that is communicably coupled to the processor and electrically connected to the power source, wherein the output interface is selected from the group consisting of an antenna for wireless communication, an optical transmitter, a sonic transmitter, or a transmitter in the electromagnetic spectrum.

12. The apparatus as recited in claim 1, further comprising a smart card interface mounted on the substrate that is communicably coupled to the processor and electrically connected to the power source.

13. The apparatus as recited in claim 1, further comprising a contactless interface disposed within the substrate that is communicably coupled to the processor and electrically connected to the power source, wherein the contactless interface is selected from the group consisting of an antenna for wireless communication, an optical transceiver, a sonic transceiver, or a transceiver in the electromagnetic spectrum.

14. The apparatus as recited in claim 1, wherein the substrate is integrated into:
  a card selected from the group consisting of an access card, a credit card, a debit card, an identification card, a drivers license, a firearm license, a physical access security card, a mini-card, a security card, a stored value card and a vendor-specific card;
  a travel credential selected from the group consisting of a passport, an immigration card and a visa;
  a personal communication device selected from a group consisting of a personal data assistant, a telecommunications device, a pager, a computer and an electronic mail transceiver; or
  a personal device/belonging selected from a group consisting of a watch, a jewelry, a key ring, a tag and eye glasses.

15. A method for enabling a transaction using an apparatus containing information associated with one or more users, an initiator, and a magnetic field generator that is normally inactive and comprises a magnetic stripe either mounted on a substrate or disposed within the substrate, one or more induction coils disposed within the substrate underneath a length of the magnetic stripe and a control circuit disposed within the substrate that is connected to the one or more induction coils, the method comprising the steps of:
  receiving information from the initiator;
  determining whether the received information is valid for one of the users; and
  whenever the received information is valid: (a) accessing the information stored in the apparatus, (b) generating a time varying code using an algorithm, one or more static variables and one or more time-based dynamic variables, and (c) activating the magnetic field generator and generating a time-varying magnetic signal containing the information associated with the one or more users and the time varying code by pulsing the one or more induction coils underneath the magnetic stripe, wherein the time-varying magnetic signal is transmitted to a magnetic stripe reader and emulates a data stream generated by swiping a static magnetic stripe card through the magnetic stripe reader but is not created by swiping the magnetic stripe of the apparatus through the magnetic stripe reader or using an adapter to interface with the magnetic stripe reader.

16. The method as recited in claim 15, wherein:
  the information associated with the one or more users enables approval of the transaction; and
  the transaction comprises an access transaction, a control transaction, a financial transaction, a commercial transaction, an identification transaction or a combination thereof.

17. The method as recited in claim 15, further comprising the step of activating the magnetic field generator and generating a magnetic signal that enables denial of the transaction whenever the authentication data is not valid.

18. The method as recited in claim 15, wherein:
  the initiator comprises a biometric sensor that provides biometric information, a user interface that provides user information and/or one or more commands, or a combination thereof;
  the biometric sensor is selected from the group consisting of a fingerprint sensor, retina sensor, iris sensor, signature, DNA sensor or voice sensor; and
  the user interface is selected from the group consisting of a touch pad, one or more buttons, a display and a voice sensor.

19. The method as recited in claim 18, further comprising the steps of:
  transmitting the biometric information a system processor via the magnetic field generator; and
  using the biometric information to verify that a user is authorized to use the apparatus.

20. The method as recited in claim 15, further comprising the steps of deactivating the magnetic field generator after the magnetic field generator has been active for a specified period of time, when the biometric sensor no longer detects the authorized user or both.

21. The method as recited in claim 15, wherein:
  the one or more static variables comprise a biometric information, a reproducible artifact from the biometric information, a cardholder's name, an account number, an expiration date, a issuer, a validation code, a secret code associated with the apparatus, a personal identification number, or a combination thereof; and
  the one or more time-based dynamic variables comprise a date and time, a time interval, or a combination thereof.

22. The method as recited in claim 21, further comprising the step of encrypting the time varying code is encrypted, modifying the time varying code by access information associated with the user or a combination thereof.

23. The method as recited in claim 15, further comprising the step of receiving one or more activation parameters, wherein the one or more activation parameters includes detecting data from a biometric sensor, detecting an external signal or receiving data from a user interface.

24. The method as recited in claim 15, further comprising the steps of:
  receiving power from an external power source in a contactless manner; and
  converting the power received from the external power source into power compatible with the apparatus.

25. A computer program embodied in a non-transitory computer readable medium executed by a processor for enabling a transaction using an apparatus containing information associated with one or more users, an initiator, and a magnetic field generator that is normally inactive and comprises a magnetic stripe either mounted on a substrate or disposed within the substrate, one or more induction coils disposed within the substrate underneath a length of the magnetic stripe and a control circuit disposed within the substrate that is connected to the one or more induction coils, the computer program comprising:
  a code segment for receiving information from the initiator;
  a code segment for determining whether the received information is valid for one of the users; and
  a code segment for whenever the received information is valid: (a) accessing the information stored in the apparatus, (b) generating a time varying code using an algorithm, one or more static variables and one or more time-based dynamic variables, and (c) activating the magnetic field generator and generating a time-varying magnetic signal containing the information associated with the one or more users and the time varying code by pulsing the one or more induction coils underneath the magnetic stripe, wherein the time-varying magnetic signal is transmitted to a magnetic stripe reader and emulates a data stream generated by swiping a static magnetic stripe card through the magnetic stripe reader but is not created by swiping the magnetic stripe of the apparatus through the magnetic stripe reader or using an adapter to interface with the magnetic stripe reader.

26. A system comprising:
one or more user devices, each user device comprising
a substrate,
a magnetic field generator disposed within the substrate, wherein the magnetic field generator is normally inactive and comprises a magnetic stripe either mounted on the substrate or disposed within the substrate, one or more induction coils disposed within the substrate underneath a length of the magnetic stripe and a control circuit disposed within the substrate that is connected to the one or more induction coils, and generates a time-varying magnetic signal containing information stored in the apparatus and a time varying code by pulsing the one or more induction coils underneath the magnetic stripe when activated by a processor, wherein the time-varying magnetic signal is transmitted to a magnetic stripe reader and emulates a data stream generated by swiping a static magnetic stripe card through the magnetic stripe reader but is not created by swiping the magnetic stripe of the apparatus through the magnetic stripe reader or using an adapter to interface with the magnetic stripe reader,
an initiator mounted on the substrate,
a memory disposed within the substrate,
a device processor disposed within the substrate and communicably coupled to the magnetic field generator, the initiator and the memory, wherein the device processor processes information received from the initiator, and whenever the user is successfully verified based on the received information: (a) accesses the information stored in the apparatus, (b) generates the time varying code using an algorithm, one or more static variables and one or more time-based dynamic variables, and (c) activates the magnetic field generator to transmit the information stored in the apparatus and the time varying code, and
a power source disposed within the substrate and electrically connected to the magnetic field generator, the initiator and the device processor;
one or more system interfaces operable to communicate with the user device; and
a system processor communicably coupled to the one or more system interfaces.

27. The system as recited in claim 26, wherein the one or more system interfaces includes an optical interface, a smart card interface, a wireless communication interface, a magnetic reader, an initialization interface or a recharger.

28. The system as recited in claim 26, further comprising a database communicably coupled to the system processor.

29. The system as recited in claim 26, further comprising one or more remote computers communicably coupled to the system processor via a network.

30. The system as recited in claim 26, wherein:
the initiator comprises a biometric sensor that provides biometric information, a user interface that provides user information and/or one or more commands, or a combination thereof;
the biometric sensor is selected from the group consisting of a fingerprint sensor, retina sensor, iris sensor, signature, DNA sensor or voice sensor; and
the user interface is selected from the group consisting of a touch pad, one or more buttons, a display and a voice sensor.

31. The system as recited in claim 30, wherein the device processor uses the biometric information to verify that a user is authorized to use the apparatus and activates the magnetic field generator when the user is verified.

32. The system as recited in claim 30, wherein the biometric information is transmitted to the system processor via the magnetic field generator and one of the system interfaces where the system processor uses the biometric information to verify that a user is authorized to use the apparatus.

33. The system as recited in claim 30, wherein the device processor deactivates the magnetic field generator after the magnetic field generator has been active for a specified period of time, when the biometric sensor no longer detects the authorized user or both.

34. The system as recited in claim 26, wherein:
the one or more static variables comprise a biometric information, a reproducible artifact from the biometric information, a cardholder's name, an account number, an expiration date, a issuer, a validation code, a secret code associated with the apparatus, a personal identification number, or a combination thereof; and
the one or more time-based dynamic variables comprise a date and time, a time interval, or a combination thereof.

35. The system as recited in claim 34, wherein the time varying code is encrypted, modified by access information associated with the user or a combination thereof 36. The system as recited in claim 35, wherein the access information associated with the user comprises the biometric information, a reproducible artifact from the biometric information, a cardholder's name, an account number, an expiration date, a issuer, a validation code, a secret code associated with the apparatus, a personal identification number, or a combination thereof.

37. The system as recited in claim 26, wherein the power source is selected from the group consisting of a battery, a piezoelectric generator, a solar panel, an electromagnetic energy converter, a kinetic energy converter and combinations thereof.

38. The system as recited in claim 26, wherein the power source comprises:
a battery;
a power generator;
a converter electrically connected to the power generator and operable to convert power received from the power generator into power usable by the apparatus or to charge the battery;
a battery management unit connected to the battery; and
a power multiplexer connected to the battery management unit and the converter and operable to determine whether to draw power from the battery management unit, from the converter, or from both.

39. The system as recited in claim 26, further comprising a contactless interface disposed within the substrate that is communicably coupled to the device processor and electrically connected to the power source, wherein the contactless interface is selected from the group consisting of an antenna for wireless communication, an optical transceiver, a sonic transceiver, or a transceiver in the electromagnetic spectrum.

* * * * *